United States Patent
Kanamori et al.

(10) Patent No.: US 7,352,910 B2
(45) Date of Patent: Apr. 1, 2008

(54) IMAGE PROCESSING METHOD, IMAGE PROCESSING APPARATUS, AND IMAGE ENLARGING METHOD

(75) Inventors: Katsuhiro Kanamori, Nara (JP); Hideto Motomura, Nara (JP); Hiroyoshi Komobuchi, Kyoto (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 311 days.

(21) Appl. No.: 11/326,569

(22) Filed: Jan. 5, 2006

(65) Prior Publication Data

US 2006/0115176 A1  Jun. 1, 2006

Related U.S. Application Data

(63) Continuation of application No. PCT/JP2005/010401, filed on Jun. 7, 2005.

(30) Foreign Application Priority Data

Jun. 9, 2004 (JP) .............................. 2004-170766
Oct. 29, 2004 (JP) .............................. 2004-316433

(51) Int. Cl.
   *G06K 9/40* (2006.01)
(52) U.S. Cl. ...................... 382/254; 382/298
(58) Field of Classification Search ............... 382/254, 382/263, 266, 275, 276, 298, 299, 300, 240, 382/253; 345/660, 671; 358/532, 447, 451
   See application file for complete search history.

(56) References Cited

U.S. PATENT DOCUMENTS 7,062,093 B2 * 6/2006 Steger .......................... 382/216
7,085,436 B2 * 8/2006 Akhan et al. ................ 382/298
7,203,381 B2 * 4/2007 Motomura et al. ......... 382/299

FOREIGN PATENT DOCUMENTS

| JP | 11-41602 A | 2/1999 |
|---|---|---|
| JP | 11-177819 A | 7/1999 |
| JP | 2002-077660 | 3/2002 |

(Continued)

OTHER PUBLICATIONS

Yoshito Abe, Hisakazu Kikuchi, Shigenobu Sasaki, Hiromichi Watanabe and Yoshiaki Saito, "Edge Enhancement of Images Using Multiresolution Vector Quantization", IEICE Transactions, vol. J79A 1996/5 (pp. 1032-1040) with a partial English Tranlation.

(Continued)

*Primary Examiner*—Yon J. Couso
(74) *Attorney, Agent, or Firm*—Harness, Dickey & Pierce, P.L.C.

(57) ABSTRACT

An interpolated image obtained by enlarging and interpolating an image (IN) is subjected to predetermined vector transformation to calculate an image feature vector. Also, a characteristic of a subject is obtained to calculate a physical characteristic parameter of the interpolated image. The physical characteristic parameter is used to transform the image feature vector to sharpen the interpolated image. The transformed image feature vector is subjected to transformation inverse to the predetermined vector transformation to generate an enlarged image (ELI).

11 Claims, 23 Drawing Sheets

FOREIGN PATENT DOCUMENTS

| | | |
|---|---|---|
| JP | 2002-238016 | 8/2002 |
| JP | 2002-374419 A | 12/2002 |
| JP | 2003-018398 A | 1/2003 |
| JP | 2003-283807 A | 10/2003 |

OTHER PUBLICATIONS

Makoto Nakashizuka, Hiromichi Ede, Hisakazu Kikuchi, Ikuo Ishii and Hideo Makino, "Image Resolution Enhancement on Multiscale Gradient Planes", IEICE Transactions, D-II, vol. J81, D-II No. 10 (pp. 2249-2258) with a partial English translation.

* cited by examiner

FIG.4
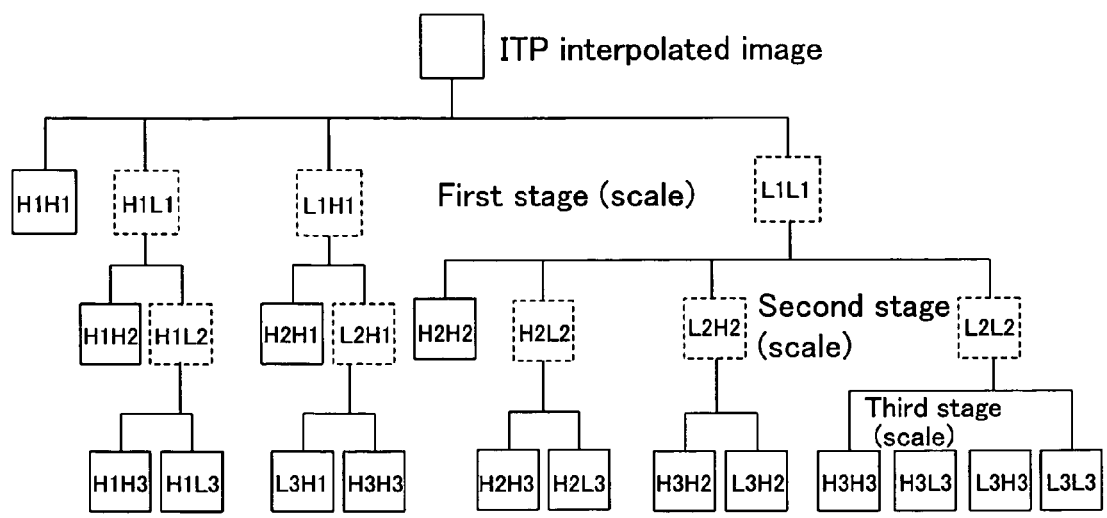
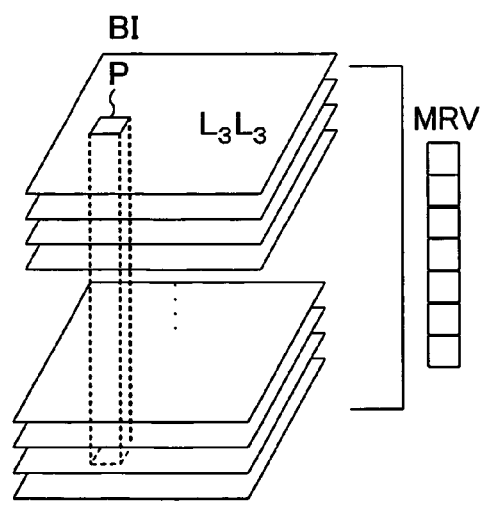

| Area number | M=(f,h,p,s,t,d,m) | L |
|---|---|---|
| A1 (Hair of head) | (0, 1, 0, 0, 0, 0, 0) | 1 (m) |
| A2 (Flesh) | (1, 0, 0, 0, 0, 0, 0) | 1 (m) |
| A3 (Clothing) | (1, 0, 0, 0, 1, 0, 0) | 1 (m) |
| A4 (Building) | (0, 0, 0, 0, 0, 1, 1) | 100 (m) |
| A5 (Woods) | (0, 0, 1, 0, 0, 0, 0) | 50 (m) |
| A6 (Leather shoes) | (0, 0, 0, 1, 0, 1, 0) | 1 (m) |

| v | IG (v) | IF (G) |
|---|--------|--------|
| 1 | 1 | 1 |
| 2 | 1 | 2 |
| 3 | 1 | 2 |
| 4 | 2 | 1 |
| 5 | 2 | 1 |
| 6 | 2 | 2 |

IMAGE PROCESSING METHOD, IMAGE PROCESSING APPARATUS, AND IMAGE ENLARGING METHOD

CROSS-REFERENCE TO RELATED APPLICATIONS

This is a continuation of Application PCT/JP2005/010401, filed on Jun. 7, 2005. This Non-provisional application claims priority under 35 U.S.C. §119(a) on Patent Application Nos. 2004-170766 and 2004-316433 filed in Japan on Jun. 9, 2004 and Oct. 29, 2004, respectively, the entire contents of which are hereby incorporated by reference.

BACKGROUND OF THE INVENTION

1. Technical Field

The present invention relates to an image processing technology, and more particularly, to a technology of sharpening an image obtained by, for example, an enlargement process or the like.

2. Background Art

With the widespread use of digital video apparatus networks, it has become common practice to handle digital images in various different standard formats using various input/output apparatuses. Particularly, there are various image sizes ranging from a low resolution to an ultra-high resolution. Examples of low-resolution images include QCIF (176×144 pixels), QVGA (320×240 pixels), CIF (352×288 pixels), and the like, which are used in a camera or a display of a mobile telephone. Examples of standard-resolution images include VGA (640×480), XGA (1024×768), SXGA (1280×1024), and the like, which are sizes for PC displays. Examples of high-resolution images include UXGA (1600×1200), QXGA (2048×1536), HDTV (1920×1080), and the like, which are used in a projector, a special LCD, or the like. Recently, there are ultra-high-resolution images, such as QSXGA (2560×2048), QXGA (2048×1536), QUXGA (3200×2400), and QUXGA-wide (3840×2400), which are used in a display for applications in the medical or printing fields.

It is here assumed that a QVGA (320×240 pixels) image captured by a mobile telephone needs to be displayed with a high definition of QUXGA (3200×2400). In this case, the length and width sizes of an original image are each digitally enlarged by a factor of 10, i.e., an unconventionally high-ratio image enlargement process is required. Conventionally, however, an enlargement ratio assumed in an ordinary digital enlargement process is about 2×2 corresponding to enlargement from the standard TV resolution to the HDTV resolution, and no more than about 4×4 enlargement ratio has been studied (see, for example, Non-patent Document 2).

One-source multi-use of images has penetrated into the broadcast business. Specifically, it is often that only a portion is extracted from a captured image and is used for other applications. For example, when a sport scene (e.g., soccer, etc.) is captured using a wide-angle lens, and an image of an individual player is extracted from the scene and zoomed up for display, an unconventionally high-ratio enlargement process is required. The target value of the enlargement ratio in such an image extracting process has no upper limit.

Thus, image enlargement is a large challenge to digital image processing. The image enlargement technically means that a low-resolution image is transformed into a high-resolution image. The image enlargement, i.e., making higher-resolution, is divided into two categories, depending on whether importance is put on an image input system or an image display system.

The first category is an enlargement process (making higher resolution) in which importance is put on the image input system, corresponding to a so-called "super-resolution" field. Digital super-resolution is achieved by capturing subject information while minutely vibrating an image capturing device or from successive moving images to collect information beyond the sampling limit of the image capturing device, followed by integration and convergence to increase the definition of an original image. This technique is suitable for scientific image measurement in a medical or remote sensing field.

The second category is an enlargement process in which importance is put on the image display system. This technique is intended to transform a blurred image to a visually sharp and preferable image (image sharpening) rather than a high-resolution image faithful to its original image. The technique is employed when an image captured by a camera of a mobile telephone is displayed on a high-resolution display, an standard TV image is displayed on an HDTV screen, or the like. For consumer image apparatuses, an image enlargement process which produces quality tolerable for such high-resolution display is required. The present invention is directed to the process in which importance is put on the image display system.

As conventional techniques in the art, a linear interpolation filter (e.g., bicubic interpolation, etc.), an edge preserving nonlinear filter which enlarges an image while preserving an edge to avoid blurring, and the like, have been studied for many years. However, with these techniques, it is not possible to restore or estimate a high frequency component which a low-resolution image lacks. In order to restore a high frequency component, a technique of using a learning process with low-resolution and high-resolution image samples has been recently studied. Hereinafter, two examples of this technique will be described.

Patent Document 1 discloses a method of generating a high-resolution image from a low-resolution image. Initially, an initial low-resolution image is interpolated or scaled up into a low-resolution image having a desired image size. The resultant low-resolution image is divided into low-resolution patches overlapping each other. For each low-resolution patch, a mid-band patch from which a high frequency component is removed is generated. Thereafter, while scanning the image, a pixel M in a mid-band patch whose contrast is normalized and an adjacent high-band patch H which has already been predicted are linked serially to generate a search vector, and a closest high-band patch is output from a database for training. The high-band patch and the low-resolution patch are combined by addition to successively generate a high-resolution patch having connectivity to an adjacent patch, thereby generating a high-resolution image.

Non-patent Document 1 discloses a technique of sharpening a blurred image by applying wavelet transform. Initially, a sharp image and a degraded image having a blurred edge are subjected to three-stage discrete binary two-dimensional wavelet transform to obtain a 16-dimensional multi-resolution vector for each coordinate in the image. Since only an edge portion in the image is targeted, M learning vectors are used, excluding smoothed components. N representative vectors selected from M learning vectors of a blurred image are listed on an analysis codebook, and N representative vectors generated from M learning vectors of a sharp image are listed on a temporary reproduction codebook. A sharpening process is achieved by looking up the temporary reproduction codebook via a quantization index from the analysis codebook.

Patent Document 1: Japanese Unexamined Patent Publication No. 2003-18398

Non-patent Document 1: Yoshito Abe, Hisakazu Kikuchi, Shigenobu Sasaki, Hiromichi Watanabe, and Yoshiaki Saito, "Edge Enhancement of Images Using Multiresolution Vector Quantization", IEICE Transactions, Vol. J79A 1996/5 (pp. 1032-1040)

Non-patent Document 2: Makoto Nakashizuka, Hiromichi Ebe, Hisakazu Kikuchi, Ikuo Ishii, and Hideo Makino, "Image Resolution Enhancement on Multiscale Gradient Planes", IEICE Transactions, D-II, Vol. J81, D-II No. 10 (pp. 2249-2258)

However, there are the following problems with conventional techniques.

Specifically, in the case of techniques using a feature vector obtained by image waveform signal analysis, such as a mid-band frequency vector of a pixel value in an image, a wavelet transform coefficient vector, or the like, image input information is only processed. Therefore, when an enlargement ratio is particularly large, it is difficult to obtain a result much more satisfactory than that of a linear image process, such as a conventional bicubic interpolation technique or the like.

The present inventors consider that it is necessary to accurately incorporate, into image processing, a characteristic of a subject to be captured in an image, such as a material, a distance from a camera, or the like, in addition to image information, in order to more effectively achieve sharpening of an image, i.e., a process of transforming a blurred image into a visually sharp and preferable image.

In addition, by performing such image sharpening after enlargement and interpolation of a low-resolution image, it is possible to generate an enlarged image tolerable for high-resolution display quality from a low-resolution image having a low image size.

SUMMARY OF THE INVENTION

The present invention is provided to solve the above-described problems. An object of the present invention is to provide an image process of sharpening an image, effectively taking into consideration a characteristic of a subject, such as a material, a distance from a camera, or the like.

In the present invention, predetermined vector transformation is performed with respect to an original image to calculate an image feature vector, a characteristic of a subject appearing in the original image is obtained, a physical characteristic parameter of the original image is calculated from the obtained subject characteristic, the image feature vector is transformed with reference to the physical characteristic parameter to sharpen the original image, and the transformed image feature vector is subjected to transformation inverse to the predetermined vector transformation, to generate a new image.

According to the present invention, a characteristic of a subject appearing in an original image is obtained, a physical characteristic parameter of the original image is calculated from the subject characteristic. An image feature vector obtained by predetermined vector transformation is transformed to sharpen the original image. In this case, a physical characteristic parameter is referenced. Thereafter, the transformed image feature vector is subjected to transformation inverse to the predetermined vector transformation, to generate a new image. Therefore, a sharpened image in which a characteristic of a subject is accurately reflected can be achieved.

The obtained subject characteristic may be at least one of material information of the subject and distance information from a camera to the subject. Thereby, a sharpened image which provides realistic impression of a material or in which a change in texture size depending on the distance, can be achieved.

Preferably, a texture vector and an edge contour vector respectively corresponding to a texture portion and an edge contour portion of the original image, are obtained separately, as the image feature vector.

Also, preferably, the texture vector is transformed based on at least one of information concerning a material of the subject and information concerning a distance between the subject and a camera, the information being contained in the physical characteristic parameter. Alternatively, the edge contour vector is preferably transformed based on designated scene information.

Also in the present invention, an image is enlarged and interpolated, and the enlarged and interpolated image is subjected as an original image to the image process of the present invention.

According to the present invention, a physical characteristic parameter of an original image calculated from a characteristic of a subject is referenced with an image feature vector is transformed, thereby making it possible to achieve an image sharpening process in which the subject characteristic is accurately reflected. In addition, an image is enlarged and interpolated before such an image sharpening process is performed, thereby making it possible to generate an enlarged image tolerable for high-resolution display quality from a small-size and low-resolution image.

BRIEF DESCRIPTION OF THE DRAWINGS

FIG. 4 is a diagram illustrating an example of vector transformation using wavelet transformation.

DESCRIPTION OF THE PREFERRED EMBODIMENTS

Figure 1:
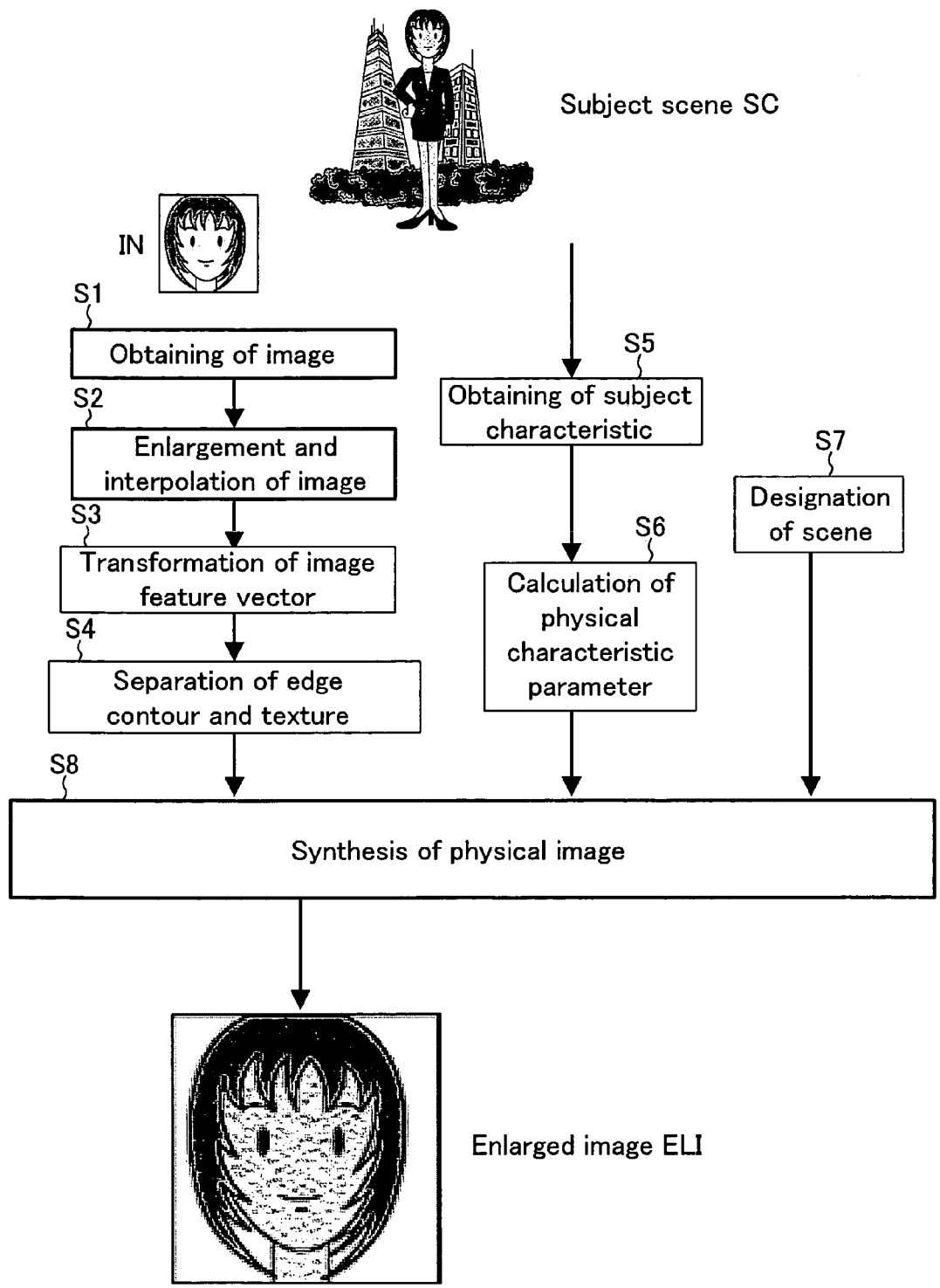
FIG. 1 is a diagram illustrating an image processing method according to an embodiment of the present invention.

According to a first embodiment of the present invention, an image processing method comprises a first step of performing predetermined vector transformation with respect to an original image to calculate an image feature vector, a second step of obtaining a characteristic of a subject appearing in the original image, and calculating a physical characteristic parameter of the original image from the obtained subject characteristic, a third step of transforming the image feature vector with reference to the physical characteristic parameter to sharpen the original image, and a fourth step of subjecting the transformed image feature vector to transformation inverse to the predetermined vector transformation, to generate a new image.

According to a second embodiment of the present invention, in the method of the first embodiment of the present invention, the obtained subject characteristic is at least one of material information of the subject and distance information from a camera to the subject.

According to a third embodiment of the present invention, in the method of the first embodiment of the present invention, the predetermined vector transformation employs Laplacian pyramid analysis or wavelet analysis.

According to a fourth embodiment of the present invention, in the method of the first embodiment of the present invention, the first step includes obtaining a texture vector and an edge contour vector respectively corresponding to a texture portion and an edge contour portion of the original image, separately, as the image feature vector, the third step includes transforming the texture vector and the edge contour vector separately, and the fourth step including subjecting the transformed texture vector and the edge contour vector together to the inverse transformation.

According to a fifth embodiment of the present invention, in the method of the fourth embodiment of the present invention, the third step including transforming the texture vector based on at least one of information concerning a material of the subject and information concerning a distance between the subject and a camera, the information being contained in the physical characteristic parameter.

According to a sixth embodiment of the present invention, in the method of the fourth embodiment of the present invention, the third step includes transforming the edge contour vector based on designated scene information.

According to a seventh embodiment of the present invention, in the method of the third embodiment of the present invention, the third step includes vector-quantizing the image feature vector with reference to an analysis codebook to calculate a quantization index, selecting an optimal reproduction codebook from a previously prepared reproduction codebook group in accordance with the physical characteristic parameter; and looking up the selected reproduction codebook using the quantization index to obtain the transformed image feature vector.

According to an eighth embodiment of the present invention, an image enlarging method comprises the steps of enlarging and interpolating an image, and subjecting the enlarged and interpolated image as the original image to an image process in accordance with the image processing method of the first embodiment of the present invention.

According to a ninth embodiment of the present invention, an image processing apparatus comprises a transformation section of performing predetermined vector transformation with respect to an original image to calculate an image feature vector, a characteristic obtaining section of obtaining a characteristic of a subject appearing in the original image, and calculating a physical characteristic parameter of the original image from the obtained subject characteristic, an image synthesizing section of transforming the image feature vector with reference to the physical characteristic parameter to sharpen the original image, and subjecting the transformed image feature vector to transformation inverse to the predetermined vector transformation, to generate a new image.

According to a tenth embodiment of the present invention, in the method of the ninth embodiment of the present invention, the characteristic obtaining section obtains material information of the subject as the subject characteristic.

According to an eleventh embodiment of the present invention, in the method of the tenth embodiment of the present invention, the characteristic obtaining section includes a sensor section capable of observing a spectroscopic characteristic, and uses an output of the sensor section to obtain the material information of the subject.

According to a twelfth embodiment of the present invention, in the method of the tenth embodiment of the present invention, the characteristic obtaining section includes an image capturing device having a pixel with spectral sensitivity specific to a predetermined material, and uses an output of the image capturing device to obtain the material information of the subject.

According to a thirteenth embodiment of the present invention, in the method of the tenth embodiment of the present invention, the characteristic obtaining section reads material information recorded in a wireless tag attached to the subject.

According to a fourteenth embodiment of the present invention, in the method of the ninth embodiment of the present invention, the characteristic obtaining section obtains distance information from a camera to the subject as the subject characteristic.

According to a fifteenth embodiment of the present invention, in the method of the ninth embodiment of the present invention, a resolution when the subject characteristic is obtained is lower than a resolution of the original image.

According to a sixteenth embodiment of the present invention, a server-client system for enlarging an input image comprises a server and a client, wherein the server enlarges and interpolates the input image, performs predetermined vector transformation with respect to the enlarged and interpolated image to calculate an image feature vector, vector-quantizing the image feature vector to calculate a quantization index, and transmits the quantization index via a network, and the client receives via the network the quantization index, and a physical characteristic parameter of the input image, looks up a reproduction codebook using the quantization index while referencing the physical characteristic parameter, to obtain an image feature vector transformed to sharpen the interpolated image, and subjects the transformed image feature vector to transformation inverse to the predetermined vector transformation, to generate a new image.

According to a seventeenth embodiment of the present invention, a display terminal for enlarging an externally input image, comprises an interpolation section of enlarging and interpolating the input image, a transformation section of performing predetermined vector transformation with respect to the interpolated image output from the interpolation section, to calculate an image feature vector, and an image synthesizing section of transforming the image feature vector with reference to a physical characteristic parameter externally received along with the input image, to sharpen the interpolated image, and subjecting the transformed image feature vector to transformation inverse to the predetermined vector transformation, to generate a new image.

According to an eighteenth embodiment of the present invention, a display terminal for generating an image after externally receiving an image feature vector obtained by performing predetermined vector transformation with respect to an original image, comprises an image synthesizing section of transforming the image feature vector using a physical characteristic parameter externally received along with the image feature vector, to sharpen the original image, and subjecting the transformed image feature vector to transformation inverse to the predetermined vector transformation, to generate a new image.

Hereinafter, embodiments of the present invention will be described with reference to the accompanying drawings.

FIG. 1 is a diagram illustrating an image processing method according to an embodiment of the present invention. Referring to FIG. 1, in an image obtaining step S1, a subject scene SC is captured to obtain an input image IN. In an image enlargement-interpolation step S2, the input image IN is enlarged and interpolated into an intended image size using a bicubic method or the like. After enlargement and interpolation, the image has only the frequency components of the input image IN, inevitably resulting in a blurred image.

In an image feature vector transformation step S3, the enlarged and interpolated image (original image) is subjected to predetermined vector transformation to obtain a set of feature vectors (an image feature vector). The image feature vector preferably contains frequency information and scaling (resolution) information in an image space domain as with a multi-resolution vector. Therefore, for example, the transformation is preferably performed using Laplacian pyramid analysis, wavelet transformation, or the like. Thereafter, in an edge contour-texture separating step S4, the image feature vector obtained in step S3 is separated into an edge contour vector corresponding to an edge contour portion of the image and a texture vector corresponding to a texture portion of the image. Steps S3 and S4 of FIG. 1 constitute a first step of the present invention.

In a subject characteristic obtaining step S5, a characteristic of a subject captured in the input image IN is obtained. Thereafter, in a physical character parameter calculating step S6, a physical characteristic parameter of the enlarged and interpolated image is obtained from the characteristic of the subject obtained in step S5. Steps S5 and S6 of FIG. 1 constitute a second step of the present invention.

In a scene designating step S7, designated scene information is input. As used herein, the scene refers to total image capturing environment including a subject to be captured, capturing illumination, composition, and the like. In the embodiment of the present invention, the user designates an image capturing mode, such as portrait, landscape, still life, or the like, as scene information. The user may wish to create a picture in which a smooth edge is reproduced in a portrait scene, an edge is emphasized in a still life scene, or the like, even though the picture has the same composition. Therefore, the scene information is utilized to adjust the degree of emphasis of a contour edge portion of an image.

In a physical image synthesizing step S8, an enlarged image ELI is generated based the edge contour vector and the texture vector obtained in step S4 using the physical characteristic parameter obtained in step S6 and scene information obtained in step S7. Step S8 of FIG. 1 constitutes a third step and a fourth step of the present invention.

As used herein, the subject characteristic obtained in step S5 refers to, for example, information concerning a material of the subject, information concerning a distance from a camera to the subject, or the like. The material information may be obtained from spectroscopic characteristic information, near- or far-infrared information, or the like of the subject. The resolution of the subject when the subject characteristic is obtained may or may not be the same as the resolution of the enlarged and interpolated image. In other words, the resolution of the subject when the subject characteristic is obtained may be smaller than the resolution of the enlarged and interpolated image.

Figure 2:
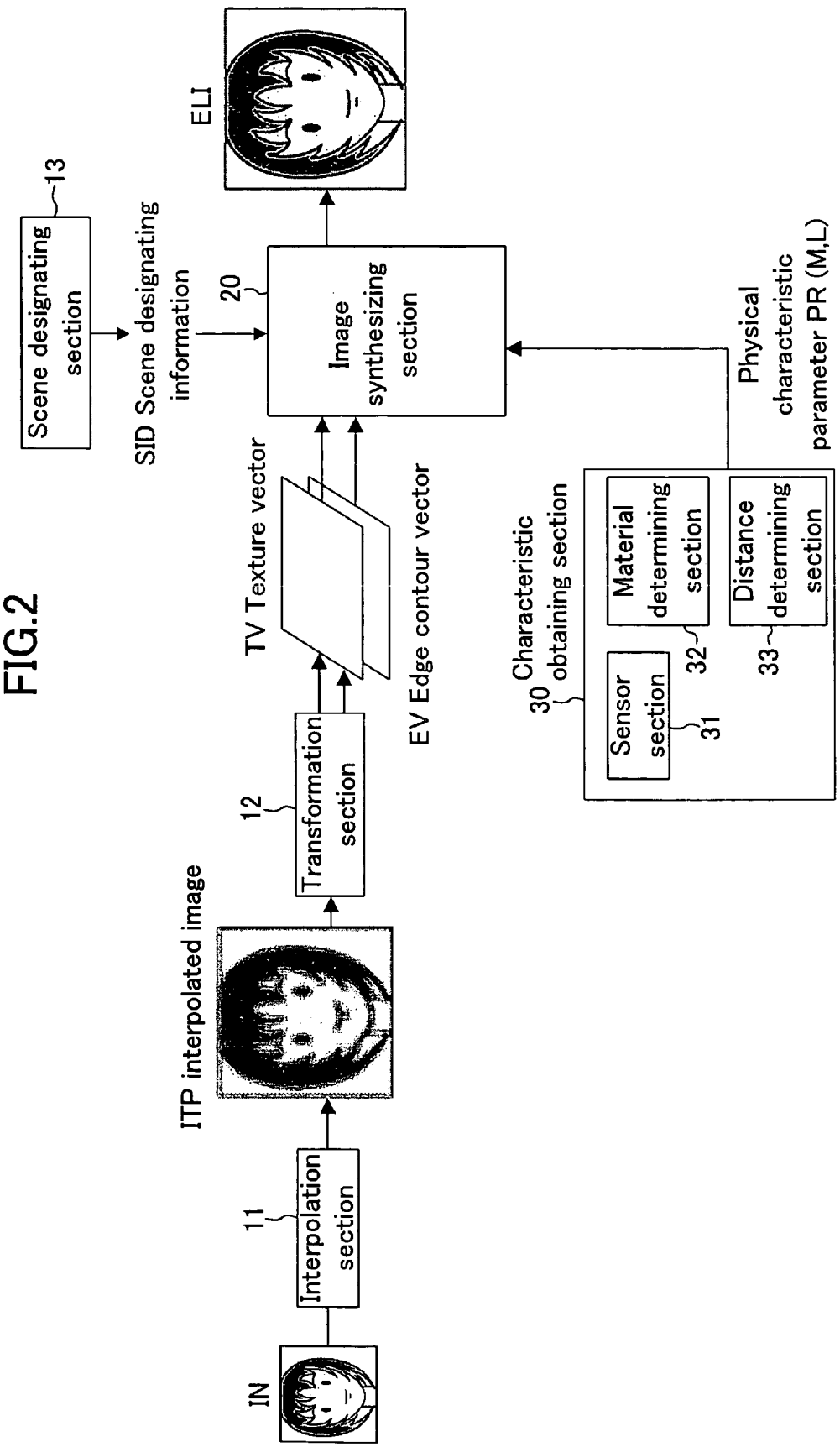
FIG. 2 is a diagram illustrating a structure of an image processing apparatus according to an embodiment of the present invention.

FIG. 2 is a diagram illustrating a structure of the image processing apparatus of the embodiment of the present invention. In FIG. 2, the interpolation section 11 performs an enlargement-interpolation process with respect to the input image IN to generate an interpolated image ITP having the same size as that the desired enlarged image ELI. As described above, the interpolated image ITP is a blurred image. A transformation section 12 performs predetermined vector transformation with respect to the interpolated image ITP to generate a texture vector TV and an edge contour vector EV as image feature vectors. The texture vector TV and the edge contour vector EV thus generated are supplied to an image synthesizing section 20.

Figure 3:
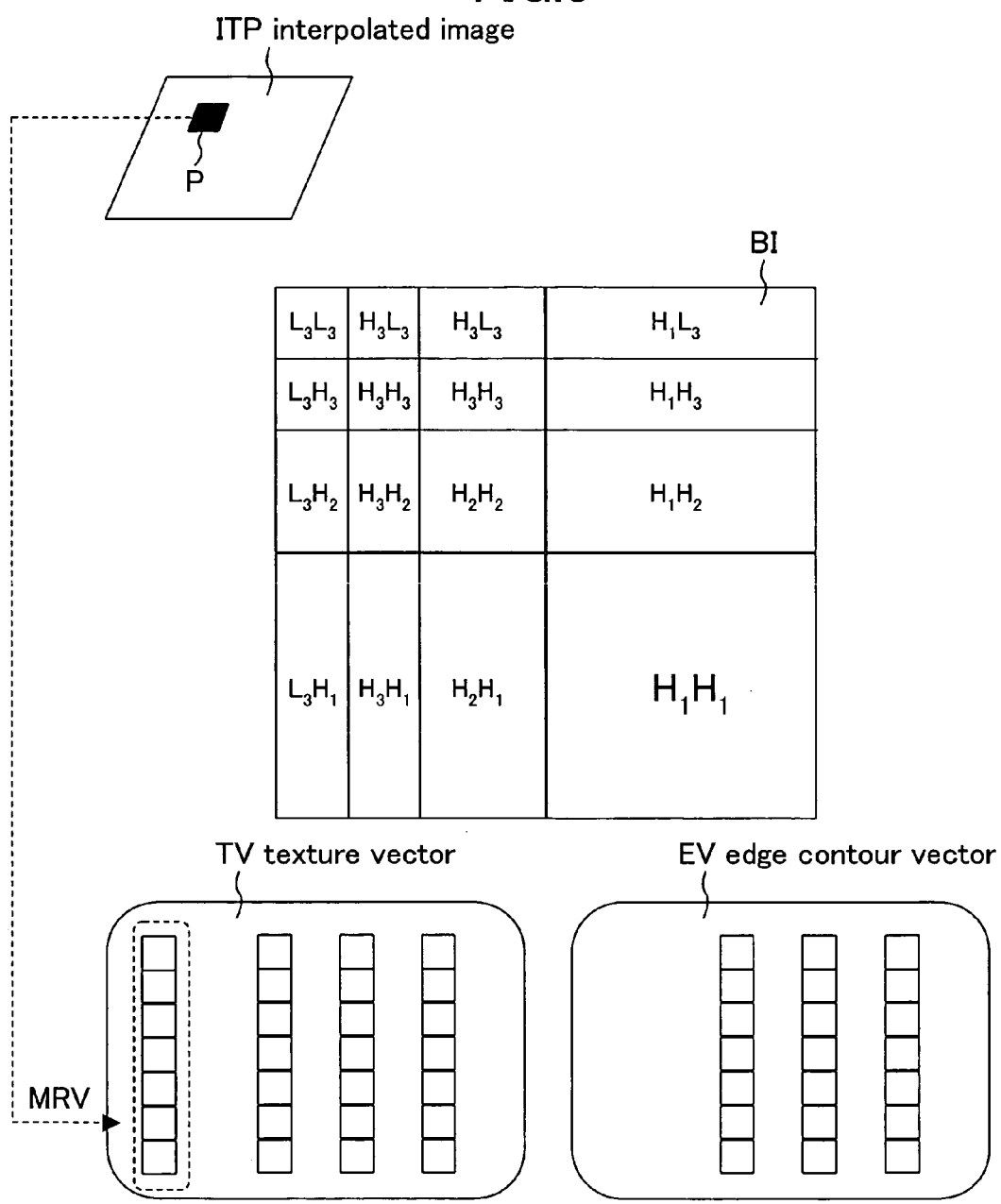
FIG. 3 is a diagram illustrating an example of vector transformation using wavelet transformation.

FIGS. 3 and 4 are each a diagram illustrating an example of vector transformation in the transformation section 12 of FIG. 2. The vector transformation employs discrete binary wavelet expansion in which thinning is not performed in a time-space domain (see Non-patent Document 1). In this technique, as is different from ordinary wavelet transformation, translational invariance is guaranteed. When scaling is performed in three stages, an original image is divided into 16 band images BI.

Specifically, as illustrated in FIG. 4, in the first stage (scale), the original interpolated image ITP is decomposed by X- and Y-directional wavelet transformation into four component images $H_1H_1$, $H_1L_1$, $L_1H_1$, and $L_1L_1$, each of which has the same size as that of the interpolated image ITP. In the second stage (scale), among the four components, both X- and Y-directional components other than the high frequency component $H_1H_1$ are further decomposed. In this case, only $L_1L_1$ is decomposed in both the X and Y directions, and $H_1L_1$ and $L_1H_1$ are each decomposed in only one direction, resulting in a total of 8 components. In the third stage (scale), the components other than $H_1H_2$, $H_2H_1$, and $H_2H_2$ are decomposed. In this case, only $L_2L_2$ is decomposed both the X and Y directions, and the other components are each decomposed in only one direction, resulting in a total of 12 components. Here, components which are further decomposed into two or four with an increase in the scale (indicated with dotted lines), can be generated by subsequent synthesis.

With such wavelet transformation, the interpolated image ITP is decomposed into 16 component images (band image BI) of FIG. 3. A set of 16 components corresponding to a position of a certain pixel P of the interpolated image ITP, is referred to as a multi-resolution vector MRV of the pixel P.

In the embodiment of the present invention, a norm (absolute value) is defined with respect to the multi-resolution vector MRV. A vector having a norm greater than or equal to a predetermined upper limit value represents a contour edge, and a vector having a norm less than the predetermined upper limit represents texture. In other words, the obtained multi-resolution vector MRV is categorized into the texture vector TV or the edge contour vector EV, depending on its norm. In FIG. 3, the multi-resolution vector MRV of the pixel P is categorized into the texture vector TV.

Referring back to the structure of FIG. 2, a characteristic obtaining section 30 obtains a characteristic of a subject captured in the interpolated image ITP, and based on the subject characteristic thus obtained, calculates a physical characteristic parameter PR of the interpolated image ITP. In the embodiment of the present invention, a material parameter M concerning a material of a subject, and a distance parameter L concerning a distance between a camera and a subject, are calculated as a physical characteristic parameter PR (hereinafter referred to as PR (M, L), as appropriate). The characteristic obtaining section 30 comprises a sensor section 31, a material determining section 32, and a distance determining section 33. The physical characteristic parameter PR thus calculated is supplied to the image synthesizing section 20.

Figure 5:
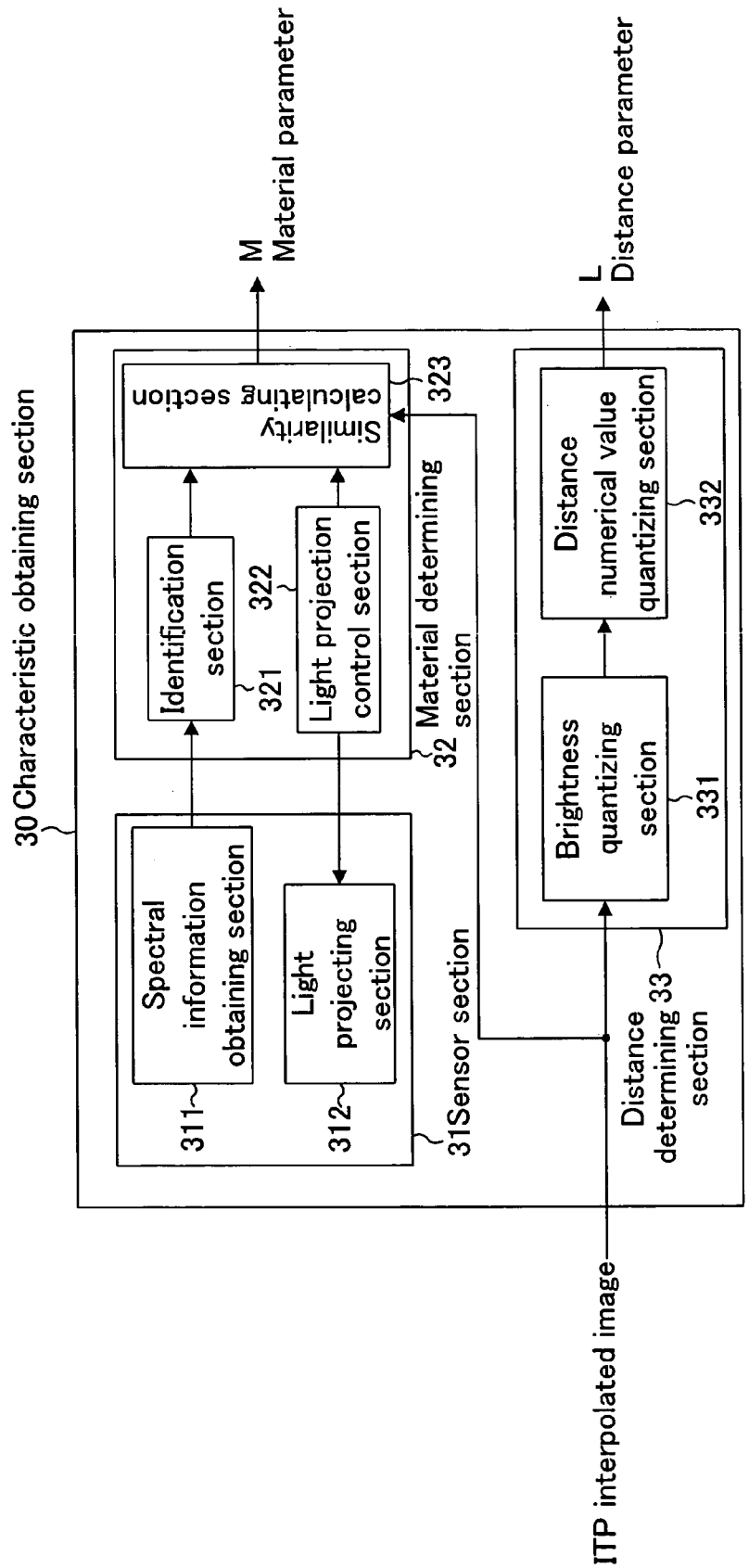
FIG. 5 is a structural diagram illustrating details of a characteristic obtaining section of FIG. 2.

FIG. 5 is a diagram illustrating a detailed structure of the characteristic obtaining section 30. As illustrated in FIG. 5, the sensor section 31 comprises a spectral information obtaining section 311 and a light projecting section 312. The material determining section 32 comprising an identification section 321, a light projection control section 322, and a similarity calculating section 323. The distance determining section 33 comprises a brightness quantizing section 331 and a distance numerical value quantizing section 332.

The light projecting section 312 emits flashlight having a specific wavelength in accordance with control of the light projection control section 322, when capturing an image of a subject. The spectral information obtaining section 311 obtains reflected light from the subject over multiple spectra in synchronization with light emission of the light projecting section 312. The identification section 321 identifies a spectral reflectance of the subject based on spectroscopic characteristics of the reflected light and spectroscopic characteristics of the emitted light. The similarity calculating section 323 calculates a material parameter M indicating similarity to a specific material based on the spectral reflectance. The material parameter M is generated in units of a pixel of the image. Here, as specific materials, human flesh f, human hair h, plant p, skin s, textile t, plastic d, and metal m are used. Specifically, the material parameter M is represented by:

$$M=(f, h, p, s, t, d, m).$$

In this case, as the spectral information obtaining section 311, an image capturing device having a plurality of types of special filters corresponding to the specific materials may be used.

Figure 6:
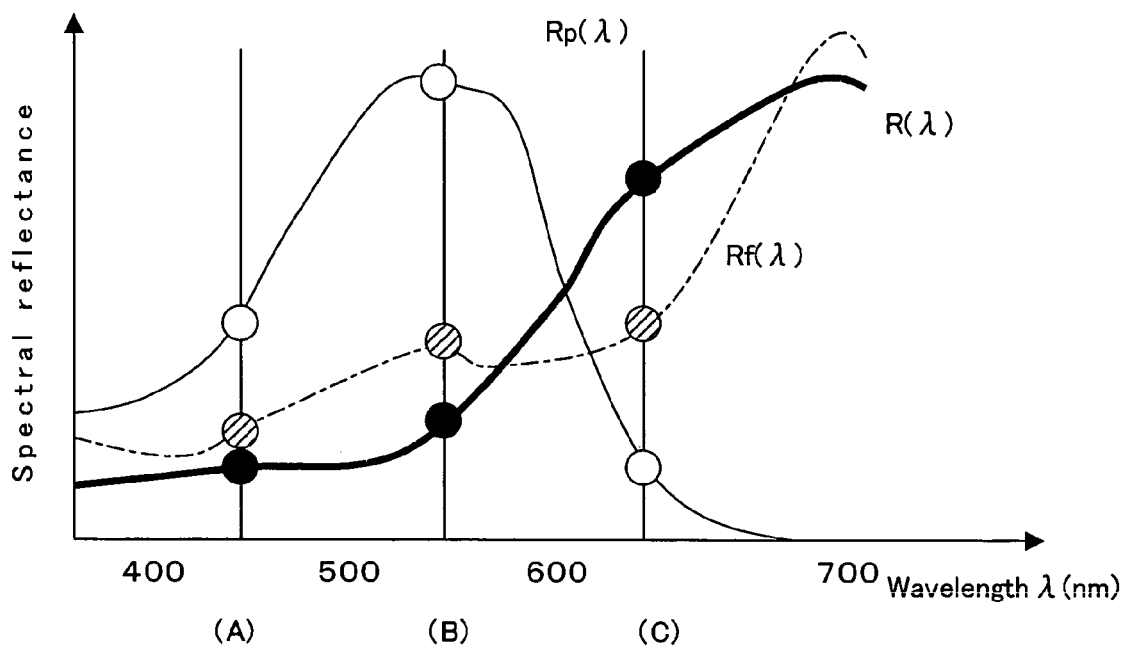
FIG. 6 is a diagram for explaining an example of a material determining process.
Figure 7:
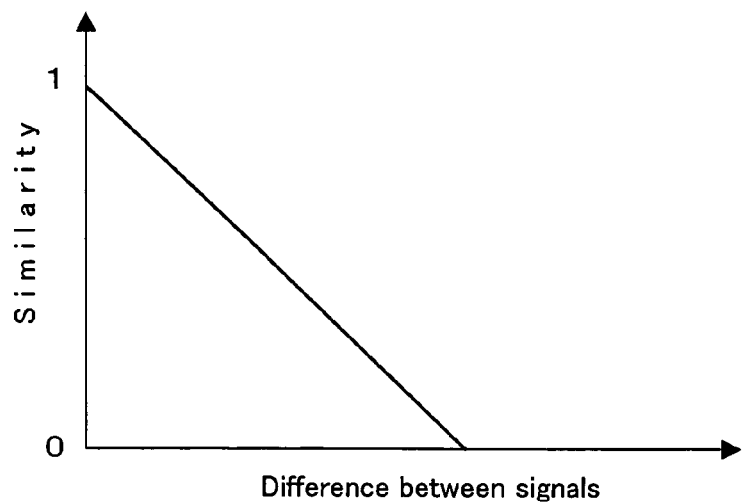
FIG. 7 is a diagram for explaining an example of a material determining process.

FIGS. 6 and 7 are each a diagram illustrating an exemplary process in the material determining section 32. In FIG. 6, $R(\lambda)$ represents a spectral reflectance of a subject, and $Rf(\lambda)$ represents a spectral reflectance of a typical human flesh, and $Rp(\lambda)$ represents a spectral reflectance of a typical plant. It is now assumed that the spectral information obtaining section 311 obtains only values observed in limited narrow bands (A), (B), and (C). Therefore, initially, a distance in a color signal space which is a distance in spectral reflectance between the subject and each material is calculated. For example, a square distance in spectral reflectance between the subject and the human flesh is represented by:

$$E2=[R(A)-Rf(A)]^2+[R(B)-Rf(B)]^2+[R(C)-Rf(C)]^2.$$

Next, the calculated distance is subjected to a threshold process in accordance with conversion illustrated in FIG. 7, so that a numerical value in the range of 0 to 1 is obtained as a similarity to flesh f. A similar process can be applied to the other materials, i.e., hair h, plant p, flesh s, textile t, plastic d, and metal m, thereby obtaining the material parameter M. For example, in the case of ideal human flesh, it is expected:

$$M=(1, 0, 0, 0, 0, 0, 0).$$

On the other hand, in the distance determining section 33, a rough distance between the camera and the subject is determined based on the degree of the brightness of the image varying depending on the projected light. The brightness quantizing section 331 quantizes the brightness of the image obtained in synchronization with light emission of the light projecting section 312. The distance numerical value quantizing section 332 generates a distance parameter L ranging over several steps based on the quantized brightness value. The distance parameter L is output for each pixel of the image.

In this manner, the physical characteristic parameter PR (M, L), which is a pair of the material parameter M and the distance parameter L, is generated. Note that the physical characteristic parameter PR is used only in a process with respect to a texture portion of an image which is relatively flat, but not in a process with respect to an edge contour portion. Therefore, the physical characteristic parameter PR may be obtained with a resolution lower than that of the input image.

Figures 8, 9:
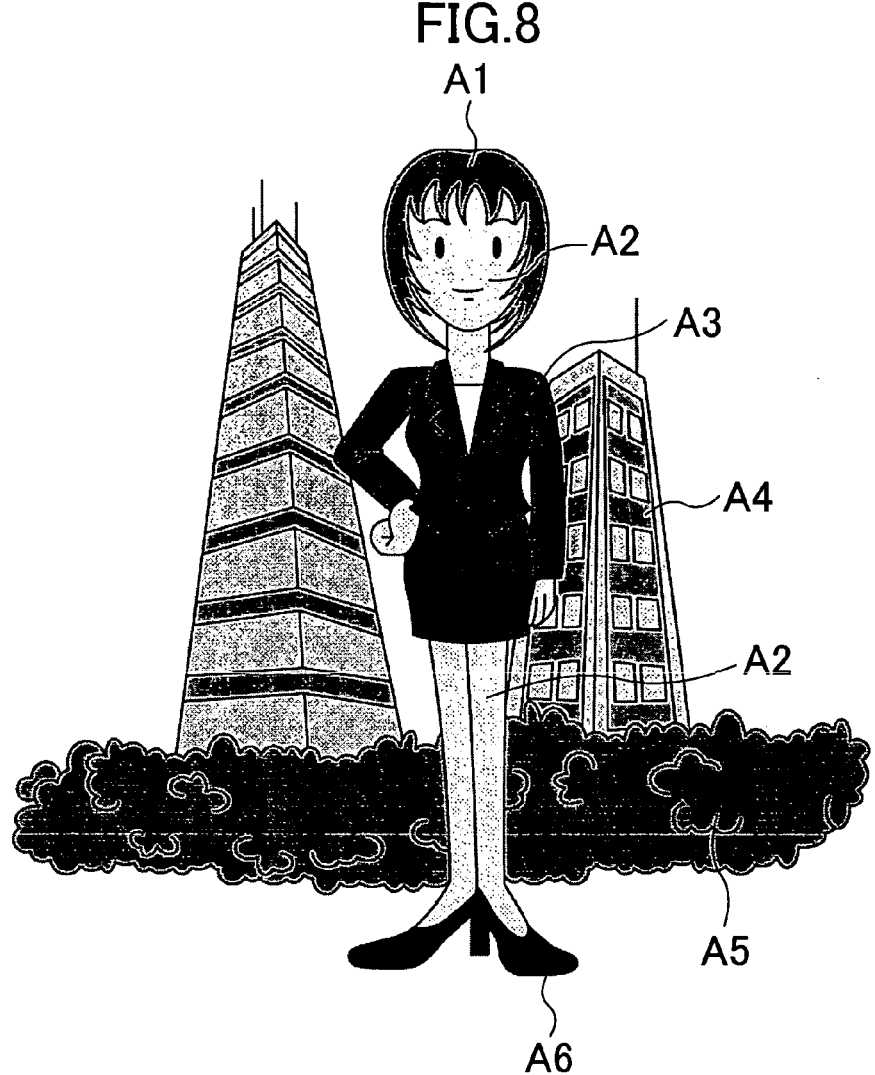
FIG. 8 is a diagram illustrating an image of an outdoor portrait scene.
FIG. 9 is a diagram illustrating an example of a physical characteristic parameter in the image of FIG. 8.

FIG. 9 is a diagram illustrating an example of the physical characteristic parameter PR obtained in an image of an outdoor portrait scene illustrated in FIG. 8.

Referring back to FIG. 2, the image synthesizing section 20 transforms the texture vector TV and the edge contour vector EV based on the physical characteristic parameter PR output from the characteristic obtaining section 30 and scene designating information SID output from a scene designating section 13, to sharpen the interpolated image ITP. Thereafter, the transformed vectors TV and EV are subjected to transformation inverse to the vector transformation in the transformation section 12, into an image. As a result, the high-resolution enlarged image ELI is generated.

It is here assumed that the texture vector TV and the edge contour vector EV are transformed using a previously learnt vector-to-vector correspondence table, i.e., a codebook.

Figure 10:
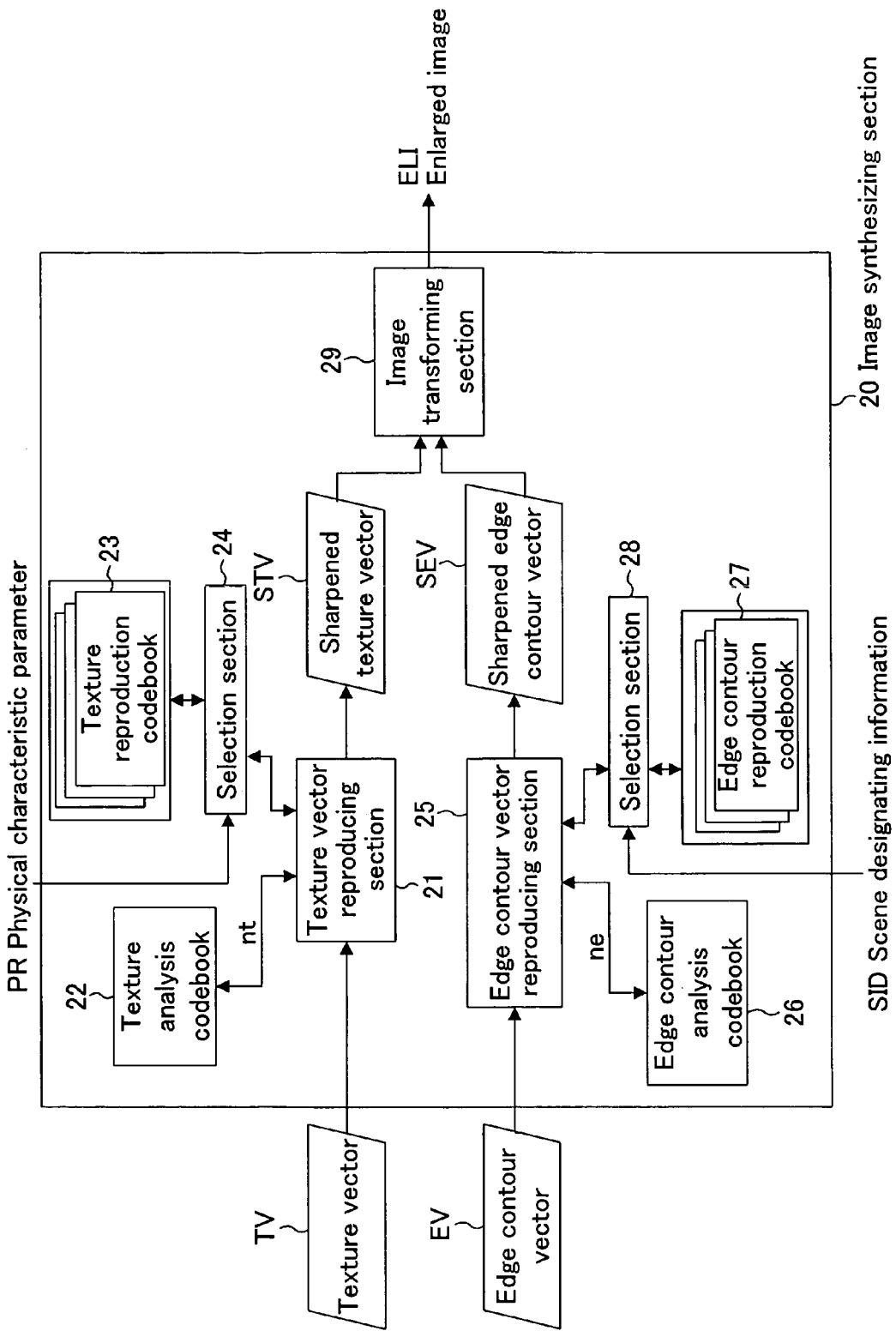
FIG. 10 is a structural diagram illustrating details of an image synthesizing section of FIG. 2.

FIG. 10 is a diagram illustrating a detailed structure of the image synthesizing section 20. In FIG. 10, a texture vector reproducing section 21 transforms the texture vector TV into a sharpened texture vector STV. In this case, a texture analysis codebook 22, and a texture reproduction codebook selected by a selection section 24 from a texture reproduction codebook group 23, are referenced. The selection section 24 selects a texture reproduction codebook, depending on the material and distance indicated by the physical characteristic parameter PR.

An edge contour vector reproducing section 25 transforms the edge contour vector EV into a sharpened edge contour vector SEV. In this case, an edge contour analysis codebook 26, and an edge contour reproduction codebook selected by a selection section 28 from an edge contour reproduction codebook group 27, are referenced. The selection section 28 selects an edge contour reproduction codebook, depending on a scene indicated by the scene designating information SID.

Figure 11:
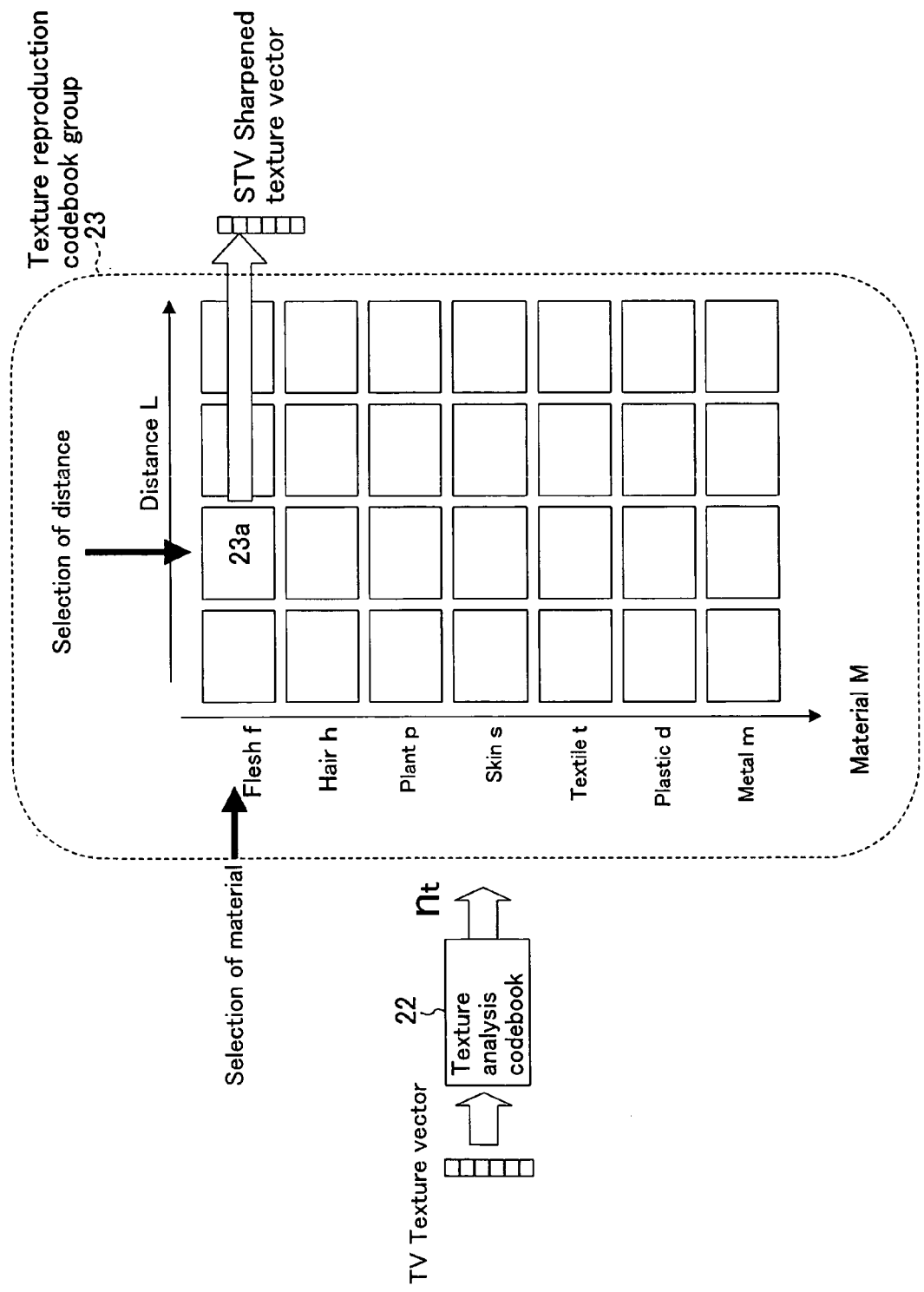
FIG. 11 is a conceptual diagram illustrating a transforming process with respect to a texture vector.

FIG. 11 is a conceptual diagram illustrating a transformation process performed with respect to the texture vector TV. As illustrated in FIG. 11, by looking up the texture analysis codebook 22, a quantization index nt which is obtained by vector-quantizing the texture vector TV is read out. The quantization index nt is calculated by a signal waveform process with respect to the image without taking the physical characteristic information into consideration. On the other hand, in the texture reproduction codebook group 23, a texture reproduction codebook is prepared for each of the materials, such as flesh f, hair h, and the like, or for each distance L. Therefore, an optimal reproduction codebook 23a is selected based on a material and a distance indicated by a given physical characteristic parameter PR. Thereafter, the sharpened texture vector STV is obtained by looking up the selected reproduction codebook 23a using the quantization index nt as a key.

In this case, instead of selecting one optimal reproduction codebook, a plurality of reproduction codebooks may be selected, and a vector read from each of the selected reproduction codebooks may be subjected to weighted interpolation synthesis using the physical characteristic parameter PR. Specifically, when the material parameter M is regarded as a weighting coefficient vector, and a reproduction vector obtained by applying the quantization index nt to a reproduction codebook corresponding to each material is represented by ZM, a finaly synthesized sharpened texture vector Z is represented by:

$$Z = M \cdot ZM$$
$$= f \cdot Zf + h \cdot Zh + p \cdot Zp + s \cdot Zs + t \cdot Zt + d \cdot Zd \cdot m \cdot Zm.$$

Similar interpolation can be applied to the distance parameter L.

Figure 12:
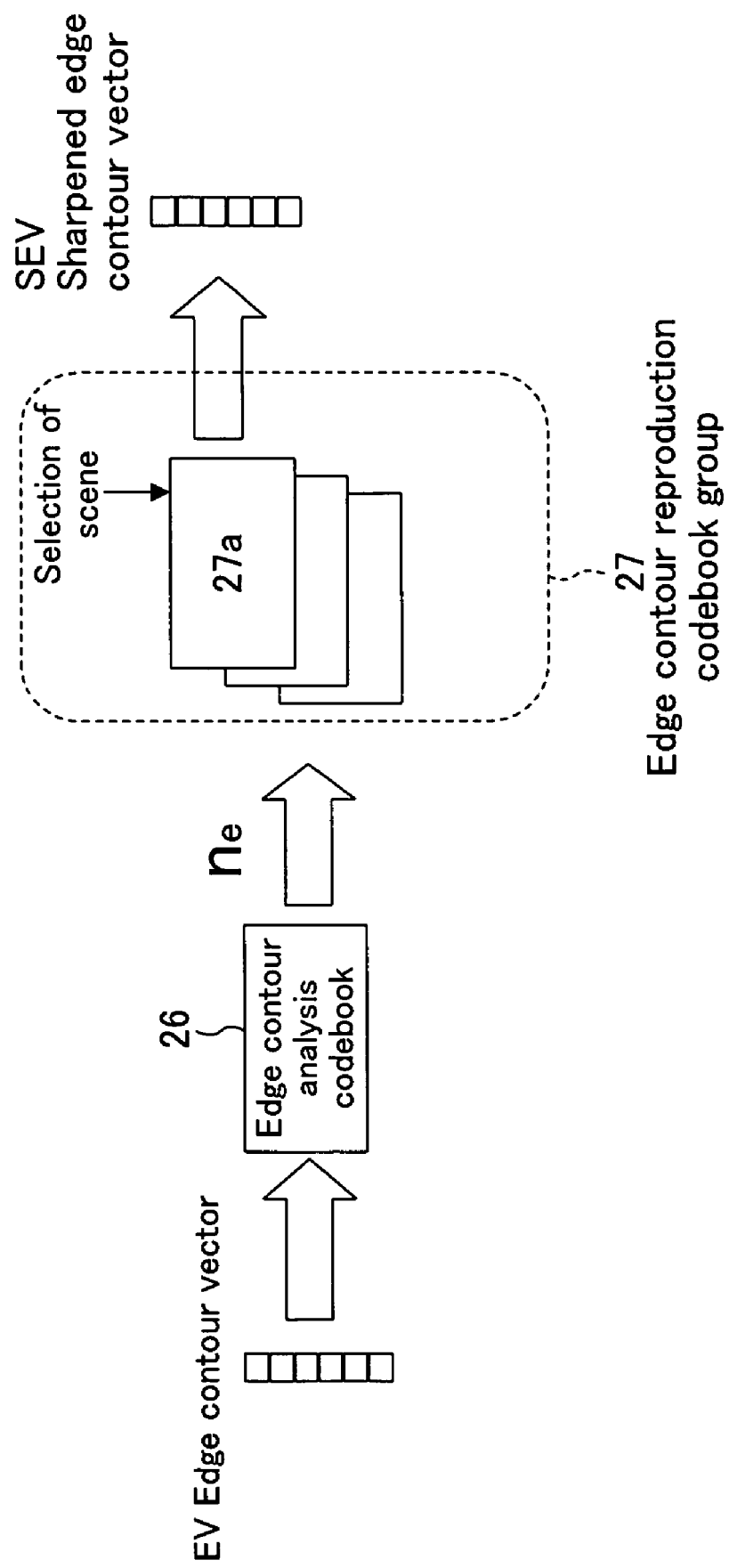
FIG. 12 is a conceptual diagram illustrating a transformation process with respect to an edge contour vector.

FIG. 12 is a conceptual diagram illustrating a transformation process with respect to an edge contour vector. As illustrated in FIG. 12, by looking up the edge contour analysis codebook 26, a quantization index ne which is obtained by vector-quantizing the edge contour vector EV is read out. On the other hand, in the edge contour reproduction codebook group 27, an edge contour reproduction codebook is provided for each scene. Therefore, an optimal edge contour reproduction codebook 27a is selected based on a scene indicated by a given scene designating information SID. Thereafter, the sharpened edge contour vector SEV is obtained by looking up the selected edge contour reproduction codebook 27a using the quantization index ne as a key.

Referring back to FIG. 10, an image transforming section 29 combines the sharpened texture vector STV and the sharpened edge contour vector SEV. The combination may be a process corresponding to addition of multi-resolution vectors, for example. After the combination, the resultant multi-resolution vector is subjected to transformation inverse to the predetermined vector transformation, thereby generating the enlarged image ELI. The inverse transformation is inverse to the vector transformation of step S3, and may be, for example, a Laplacian pyramid synthesis process, wavelet inverse transformation, or the like.

Figure 13:
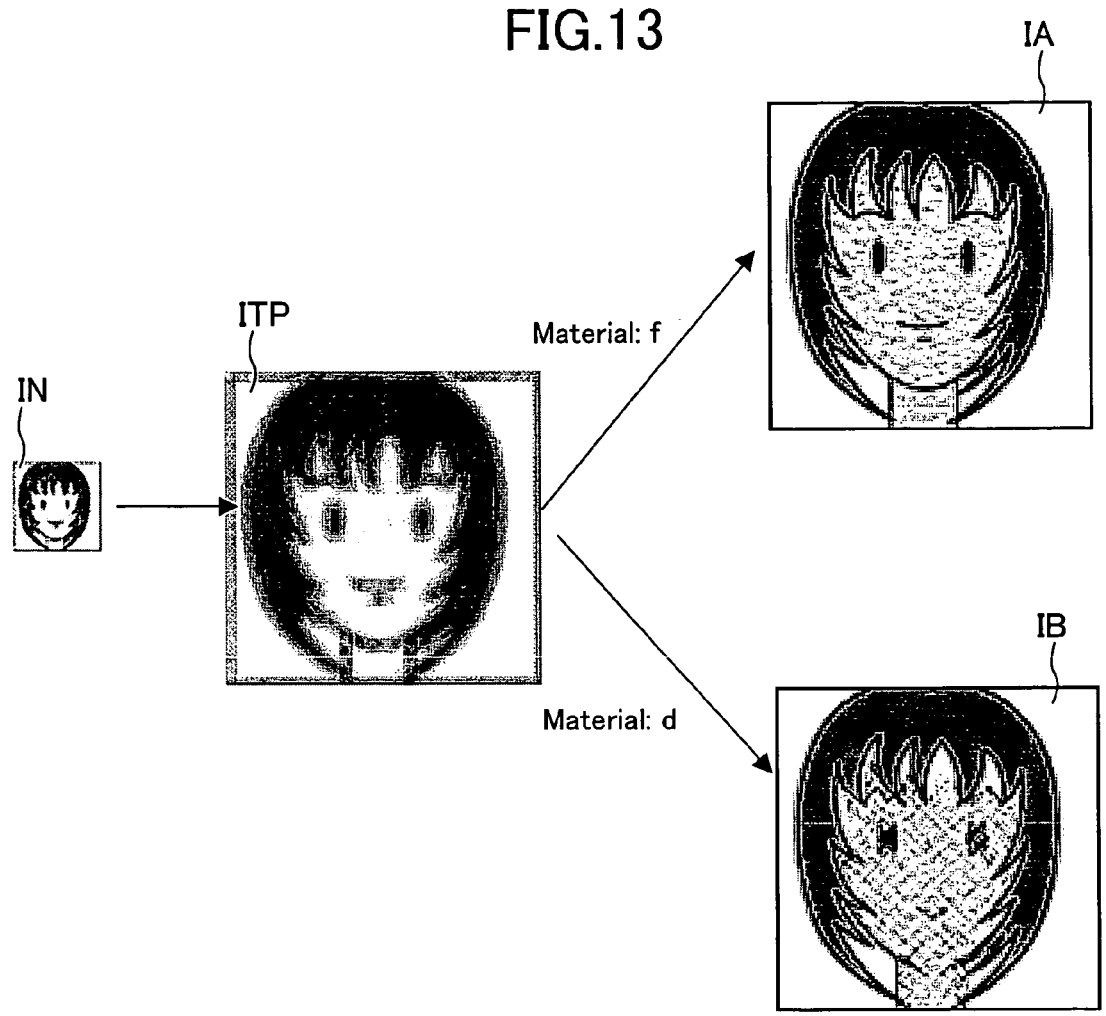
FIG. 13 is an image diagram illustrating an enlarged image obtained in an embodiment of the present invention.

FIG. 13 is an image diagram illustrating an enlarged image obtained in the embodiment of the present invention. As illustrated in FIG. 13, the input image IN (the face of a subject) is enlarged and interpolated (the interpolated image ITP), and thereafter, a sharpening process is performed. In this case, when it is determined that the subject is a human and the material is flesh (material: f), the image is enlarged to an image IA having texture similar to the flesh of a human. On the other hand, when it is determined that the subject is, for example, a mannequin and the material is plastic (material: d), the image is enlarged to an image IB having texture similar to the face of a mannequin.

Although, in the embodiment of the present invention, the input image IN is enlarged and interpolated, and the enlarged and interpolated image ITP is subjected as an original image to a sharpening process, thereby generating the enlarged image ELI., the application range of the image process according to the present invention is not limited to the image enlargement process. In addition to the case where an image is enlarged, the present invention is effective when a blurred image is sharpened or a size of an image is changed, or may be, in some cases, effective when an image is reduced.

<Creation of Codebook>

A method of creating an analysis codebook and a reproduction codebook with respect to texture or edge contour will be described with reference to FIGS. 14 to 17.

Figures 14, 15:
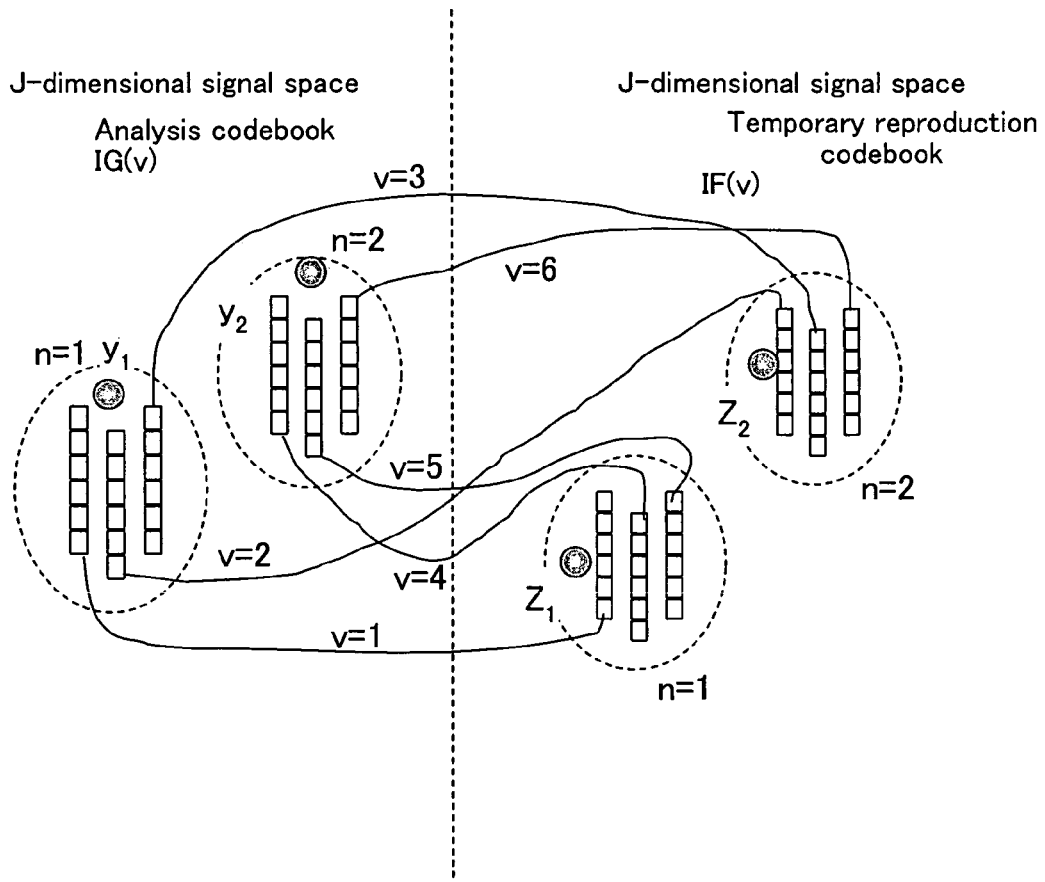
FIG. 14 is a diagram for explaining a method of creating a codebook.
FIG. 15 is a table indicating quantization indexes in the case of FIG. 14.

FIG. 14 is a diagram for explaining a basic method of creating an analysis codebook and a reproduction codebook in a J-dimensional multi-vector space. Initially, multi-resolution vector transformation is performed with respect to an image pair of a blurred image and a sharpened image, thereby obtaining, as samples, multi-resolution vectors the number of which is equal to the number of pixels. As used herein, the blurred image means a digital image containing a large amount of low frequency components compared to images of the same scene, and the sharpened image means a visually satisfactory image which contains a relatively large amount of high frequency components.

Thereafter, V learning vectors Fs(v) are selected from the multi-resolution vectors concerning the sharpened image. The learning vectors Fs(v) are used to create a temporary reproduction codebook. Here, v indicates an index of a learning vector. Next, learning vectors Gs(v) which are selected from multi-resolution vectors concerning the blurred image and have the same position as that of Fs(v), are used to create an analysis codebook.

Next, each codebook is quantized. Specifically, a vector space of each of the learning vectors Fs(v) and Gs(v) is divided into N segment regions, which are in turn quantized. A representative vector in each segment region is represented by Zn,yn. The V learning vectors each belong to any one of the regions, and therefore, a quantization index of a temporary reproduction codebook obtained for a v-th learning vector is represented by IF(v) and a quantization index of an analysis codebook obtained for the v-th learning vector is represented by IG(v). As indicated by the following expression, a temporary reproduction codebook corresponding to each index n of a blurred image is weighted with the frequency of use. Thereafter, norm normalization is performed, thereby calculating a reproduction codebook.

$$\omega_n = \frac{\sum_{IG(v)=n} z_{IF(v)}}{\left|\sum_{IG(v)=n} z_{IF(v)}\right|}$$ expression 1

FIG. 15 is a table indicating quantization indexes in the case of FIG. 14. Therefore, the reproduction codebook is obtained as follows.

$$\omega_1 = \frac{z_1 + 2z_2}{|z_1 + 2z_2|}, \omega_2 = \frac{2z_1 + z_2}{|2z_1 + z_2|}$$ expression 2

The above-described process will be described by way of an example in which an analysis codebook and a reproduction codebook are created when a blurred image of 100 pixels is transformed into a sharpened image of the same number of pixels, with respect to FIGS. 16 and 17.

A blurred image and a sharpened image are converted into multi-resolution vectors in units of 100 pixels. These are referred to as $U_1$ to $U_{100}$ and $V_1$ to $V_{100}$. The vectors $U_1$ to $U_{100}$ and $V_1$ to $V_{100}$ have the same pixel position, and therefore, a codebook may be created such that when U is input, a corresponding V is output. Note that the multi-resolution vector is actually categorized into a representative vector by vector quantization.

Figure 16:
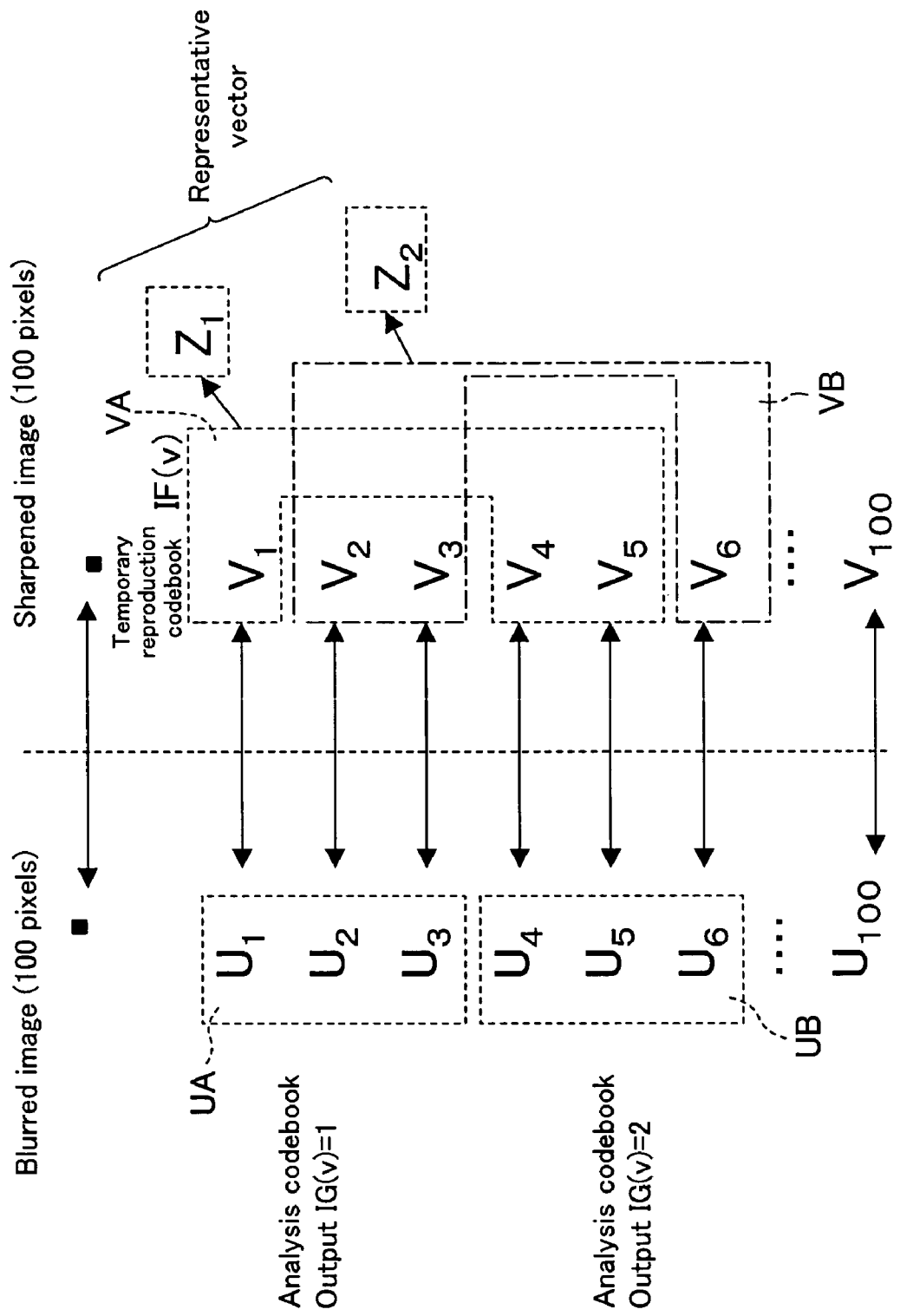
FIG. 16 is a diagram for specifically explaining creation of a codebook.

In the example of FIG. 16, the vector U of the blurred image is quantized into UA and UB, and the vector V of the sharpened image is quantized into VA and VB. The quantization index of an analysis codebook or a reproduction codebook means a number given to a set of these quantized vectors. To look up a codebook means that when a vector number V is input, the number (1, 2, etc.) of a quantized vector set is obtained. The quantized sets VA and VB are accompanied with representative vectors $Z_1$ and $Z_2$, respectively. These representative vectors are calculated by, for example, a method of calculating an average or representative value of vectors belonging to a quantized set.

Figure 17:
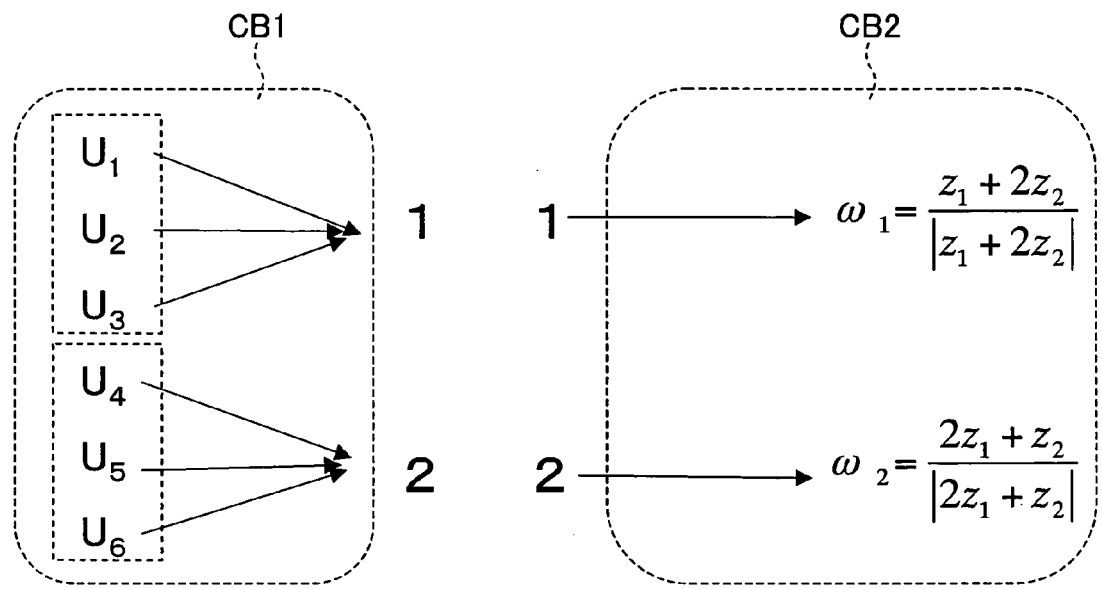
FIG. 17 is a diagram for specifically explaining creation of a codebook.

Next, by adopting the above-described calculating method, an analysis codebook CB1 in which a quantization index (1 or 2) is output based on a vector number, and a reproduction codebook CB2 in which a reproduction vector is output in response to input of the quantization index (1 or 2), are created as illustrated in FIG. 17. By using the thus-created analysis codebook and reproduction codebook in combination, a multi-resolution vector of a blurred image can be transformed into a multi-resolution vector of a sharp image.

Next, a method of obtaining a blurred image and a sharp image for obtaining a learning vector will be described.

Figure 18:
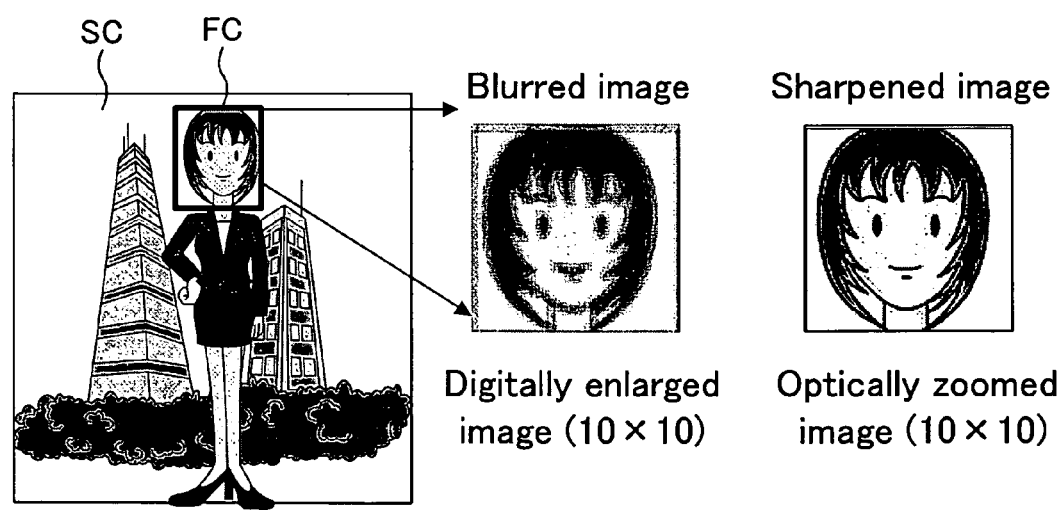
FIG. 18 is a diagram for explaining a method of obtaining a blurred image and a sharp image to obtain a learning vector.

As illustrated in FIG. 18, it is assumed that a face portion of a subject (human) is extracted from a captured scene SC, and is enlarged. It is also assumed that the number of pixels in the entire scene SC is N×N, and the size of a range FC corresponding to a face portion is (N/10×N/10).

An image extracted from the range FC is digitally enlarged to the same size as that of the original image (N×N) using, for example, a bicubic interpolation method. In this case, the generated image is a so-called blurred image containing a large amount of low frequency components. This blur is digital blur, but not optical lens blur. On the other hand, when a zoom lens is used to capture an image of the full range FC, an (N×N)-pixel sharp image having the same frame and the same angle of view and containing a large amount of high frequency components, can be obtained.

The thus-obtained pair of the blurred image and the sharp image may be used as a learning image to perform multi-resolution vector transformation, thereby creating an analysis codebook and a reproduction codebook. In addition, when a blurred image is generated, by using the same technique as the enlargement-interpolation technique of step S2, a learning image which is suitable for an actual process can be obtained.

However, a learning sample cannot be necessarily obtained using an actually captured scene. Therefore, a similar material surface is often used to perform learning, thereby creating an analysis codebook and a reproduction codebook.

In this case, there is a problem with a distance between a camera and a subject. For example, in FIG. 8, when the pattern of a tile attached on a surface of a distant building in an area A4 is reproduced, since a learning image pair is not obtained from an actual scene, it is necessary that the tile be separately prepared and an image thereof be previously captured, and the image be used to perform learning. In this case, the distance is unclear, and therefore, pairs of a blurred image and a sharp image should be learnt while changing the distance.

Figure 19:
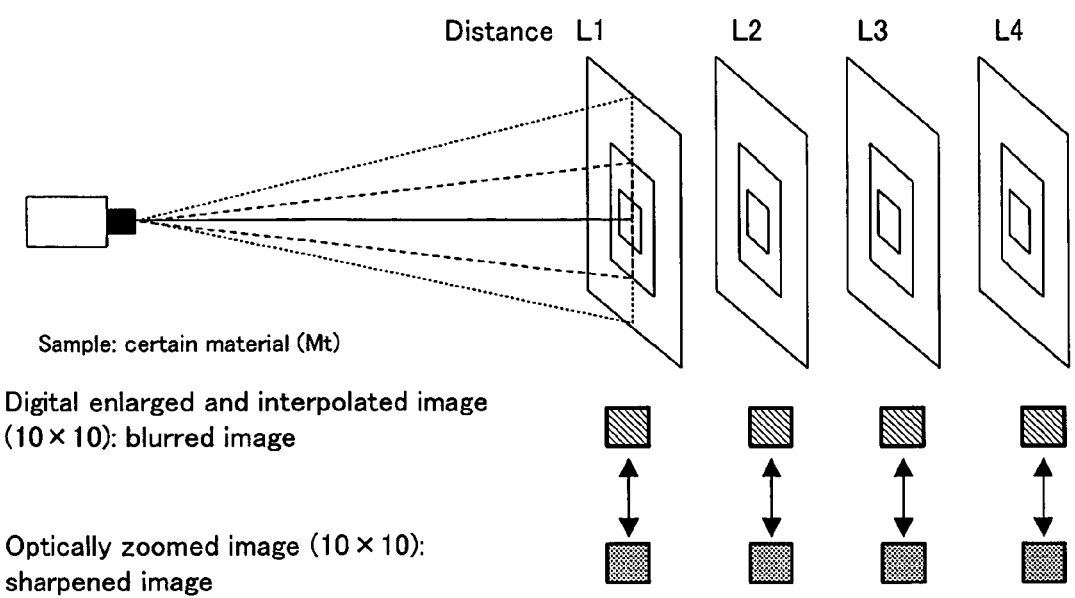
FIG. 19 is a diagram illustrating learning of a subject in consideration of a distance.

FIG. 19 is a diagram illustrating learning of a subject in consideration of a distance. As illustrated in FIG. 19, an image of a subject is captured while discretely changing a distance from L1 to L4, and for each distance, a pair of a blurred image of a subject area which is extracted from an entire image and is enlarged and interpolated, and a sharp image of the subject area which is captured by optical zooming, is produced. Thereafter, for each distance, learning of a multi-resolution vector is performed to create an analysis codebook and a reproduction codebook.

Note that, of edge contour images and texture images, it is the texture image that is affected by the distance. This is clear since the edge contour image is a line (ideal edge) which has no thickness irrespective of the distance, while the texture image has a spatial frequency which varies depending on the distance. This is the reason why, in the above-described embodiment, the distance is taken into consideration when a texture vector is sharpened, and the distance is not taken into consideration when an edge contour vector is sharpened.

Therefore, in the case of an edge contour, various scenes may be used to perform learning of pairs of a blurred image and a sharp image. It is particularly preferable to use a subject having an edge characteristic similar to a subject which is actually captured. For example, when an image of a metal subject is enlarged, a metal subject scene is preferably learnt. When an image of fabric of clothing or the like is enlarged, a fabric subject scene is preferably learnt. Therefore, an edge contour reproduction codebook group is created for each scene.

FIRST STRUCTURAL EXAMPLE

Figure 20:
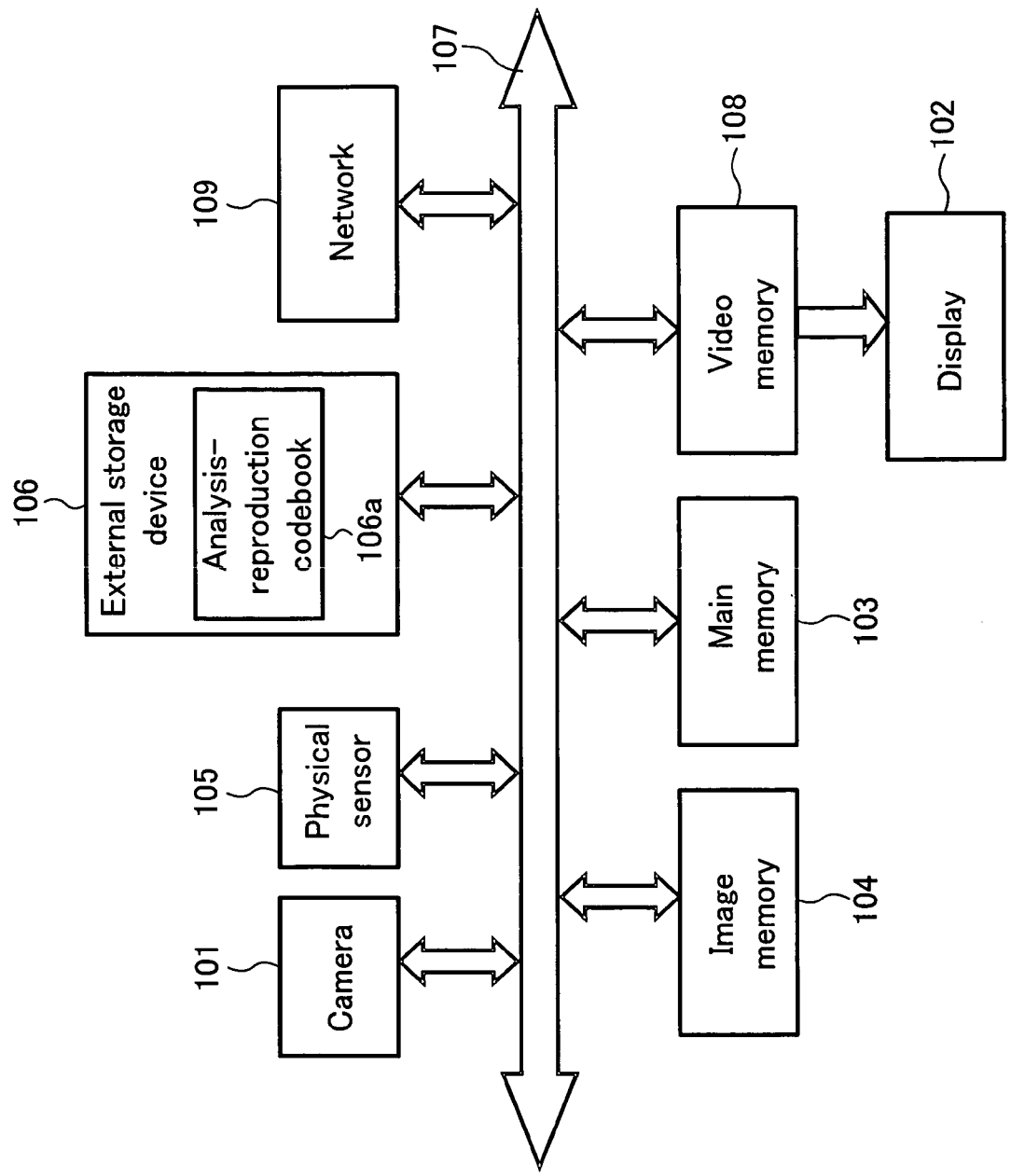
FIG. 20 is a diagram illustrating a first structural example which performs the image process of the present invention.

FIG. 20 is a diagram illustrating a structure of an image enlarging apparatus using a personal computer, as a first structural example which performs the image process of the present invention. In FIG. 20, since a resolution of a camera 101 is lower than a resolution of a display 102, an enlarged image is produced by performing an image processing program loaded in a main memory 103 in order to make the best of display ability of the display 102. The image processing program causes a computer to perform the image process described in the first embodiment.

A low-resolution image captured by the camera 101 is recorded into an image memory 104. Also, a subject characteristic obtained by a sensor 105 is recorded into the image memory 104. In an external storage device 106, an analysis codebook and a reproduction codebook (106a) of an edge contour vector and a texture vector are previously prepared, which can be referenced from the image processing program in the main memory 103. The image processing program in the main memory 103 reads the low-resolution image in the image memory 104 via a memory bus 107, transforms the low-resolution image into an enlarged image which has a resolution matching that of the display 102, and transfers the enlarged image via the memory bus 107 again to a video memory 108. The enlarged image transferred into the video memory 108 can be viewed on the display 102.

Note that the structure in which the present invention is implemented is not limited to that of FIG. 20, and may be embodied in various ways. For example, any one of an analysis codebook and a reproduction codebook may be obtained via a network 109 from an external storage device connected to another personal computer. A low-resolution image may be obtained via the network 109. A subject characteristic may be obtained via the network 109 from an external storage device connected to another personal computer, or directly from the subject via means, such as an RFID tag or the like.

Thus, the present invention can be implemented on a widespread personal computer, and does not require a special operation, management, or the like. Note that the present invention does not limit a systematization method of a personal computer in terms of an implementation of dedicated hardware, a combination of software and hardware, or the like.

Figure 21:
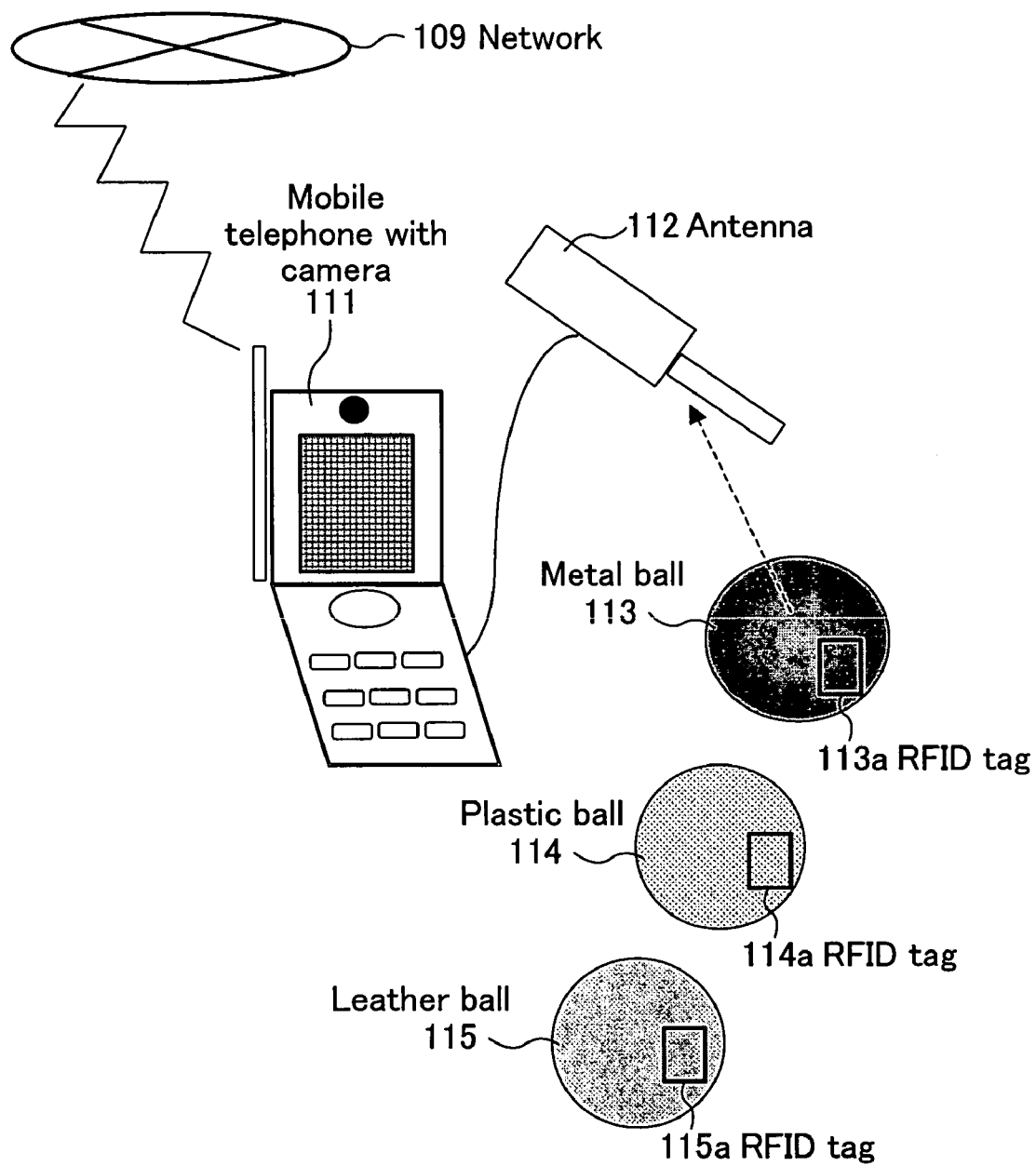
FIG. 21 is a diagram illustrating a structure of obtaining a characteristic of a subject using a wireless tag.

FIG. 21 is a diagram illustrating a structure of obtaining a characteristic of a subject using a wireless tag. In FIG. 21, a mobile telephone with camera 111 can only capture a low-resolution image, but is connected to a wireless tag antenna 112, and can obtain information concerning a characteristic of a subject from a wireless tag attached to a subject in addition to capturing of an image of the subject. Specifically, a characteristic obtaining section including the wireless tag antenna 112 is incorporated in the mobile telephone with camera 111.

Now, there are three subjects, i.e., a metal ball 113, a plastic ball 114, and a leather ball 115. When images of these subjects are captured by the mobile telephone with camera 111, a difference in the realistic impression of the material between these ball surfaces is unclear due to the low resolution. Particularly when the image is enlarged into a high-resolution image, the realistic impression of the material is significantly deteriorated. To solve this problem, wireless tags 113a, 113b, and 113c are attached to the balls 113, 114, and 115, respectively. Although the wireless tag is attached to the ball surface in FIG. 21, it may be attached inside the ball. Each of the wireless tags 113a, 113b, and 113c stores information concerning a material for the surface of the corresponding ball. It is here assumed that a rough category and a specific name of the material are stored. For example, the wireless tag 113a stores "m: copper", the wireless tag 114a stores "d: vinyl chloride", and the wireless tag 115a stores "s: cow leather".

The information is read via the antenna 112, and is stored in a memory of the mobile telephone with camera in association with the subject of the captured image. The subsequent process is performed in, for example, the structure of FIG. 20, using the image and the subject characteristic transferred via the network 109. Alternatively, the subsequent process may be performed in the mobile telephone with camera 111 as in the above-described embodiment.

SECOND STRUCTURAL EXAMPLE

Figure 22:
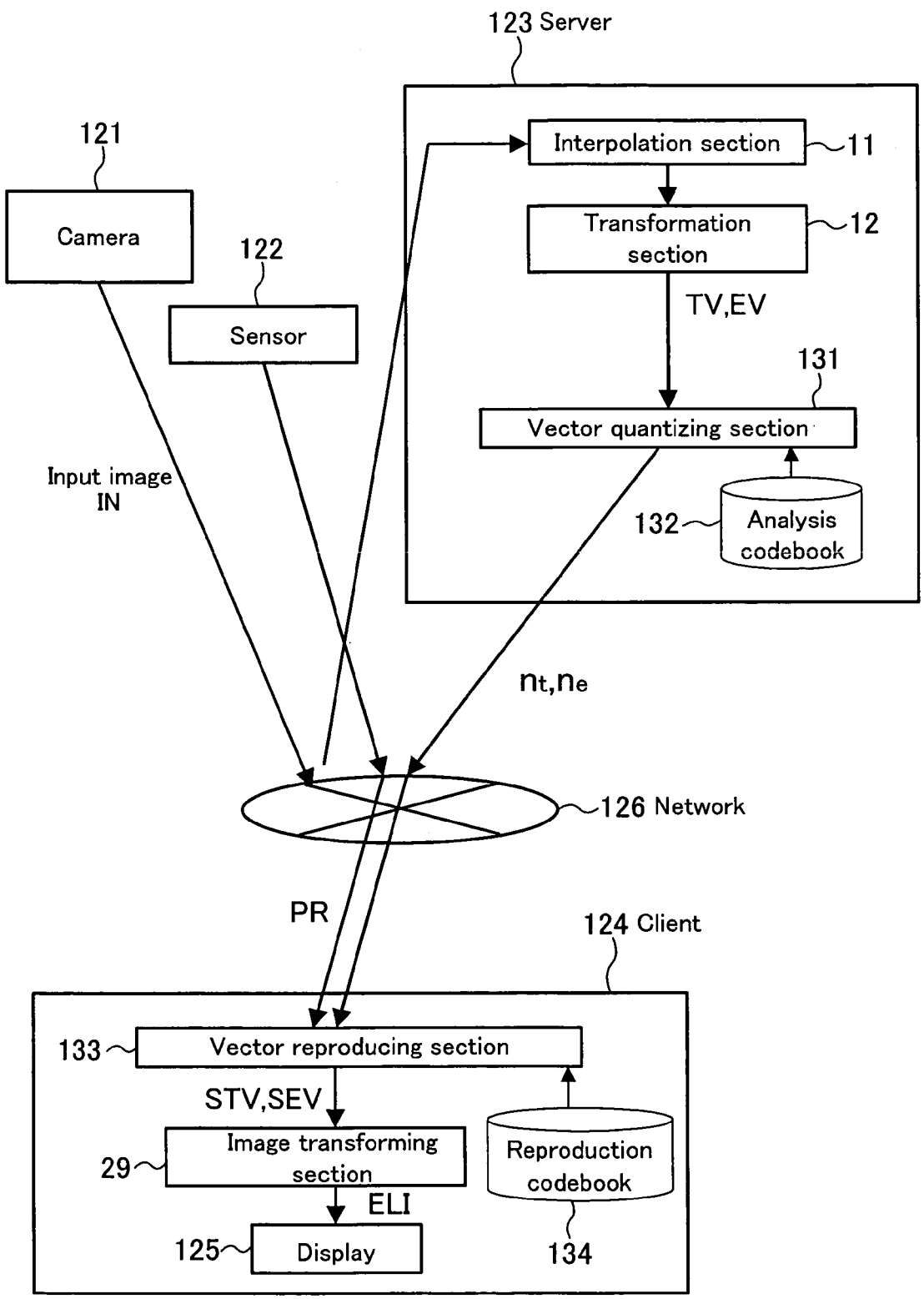
FIG. 22 is a diagram illustrating a second structural example which performs the image process of the present invention.

FIG. 22 is a diagram illustrating a structure of an image enlarging apparatus using a server-client system, as a second structural example which performs the image process of the present invention. In FIG. 22, a resolution of a camera 121 is lower than a resolution of a display 125. Therefore, the above-described image enlarging process is performed in the server-client system in order to make the best of display ability of a display 125.

A server 123 enlarges and interpolates an input image IN using an interpolation section 11, and thereafter, transforms the input image IN into an image feature vector, i.e., a texture vector TV and an edge contour vector EV, using the transformation section 12. Operations of the interpolation section 11 and the transformation section 12 are similar to those illustrated in FIG. 2. A vector quantizing section 131 uses an analysis codebook 132 provided in the server 123 to convert the texture vector TV and the edge contour vector EV into quantization indexes nt and ne. The obtained quantization indexes nt and ne are transmitted via a network 126 to a client 124. The conversion to the quantization index corresponds to a certain type of image compression, and reduces the amount of data to be transmitted.

A physical characteristic parameter PR obtained by a sensor 122 is transmitted via the network 126 to the client 124.

In the client 124, a vector reproducing section 133 uses a reproduction codebook 134 and the received quantization indexes nt and ne to generate a sharpened texture vector STV and a sharpened edge contour vector SEV. The image transforming section 29 combines the sharpened texture vector STV and the sharpened edge contour vector SEV, and performs inverse transformation to generate a sharpened enlarged image ELI. The enlarged image ELI is displayed on a display 125. Note that the vector quantizing section 131, the analysis codebook 132, the vector reproducing section 133, the reproduction codebook 134, and the image transforming section 29 are operated in a manner similar to that of the image synthesizing section 20 of FIG. 2.

Note that the structure in which the present invention is implemented is not limited to that of FIG. 22, and may be embodied in various ways. For example, the camera 121 may be a part of the client 124. Also, a characteristic of a subject may be obtained via means, such as a wireless tag or the like, instead of the sensor 122.

Thus, the present invention can be implemented on a widespread server-client system, and does not require a special operation, management, or the like. Note that the present invention does not limit a method of constructing a server-client system in terms of an implementation of dedicated hardware, a combination of software and hardware, or the like.

THIRD STRUCTURAL EXAMPLE

Figure 23:
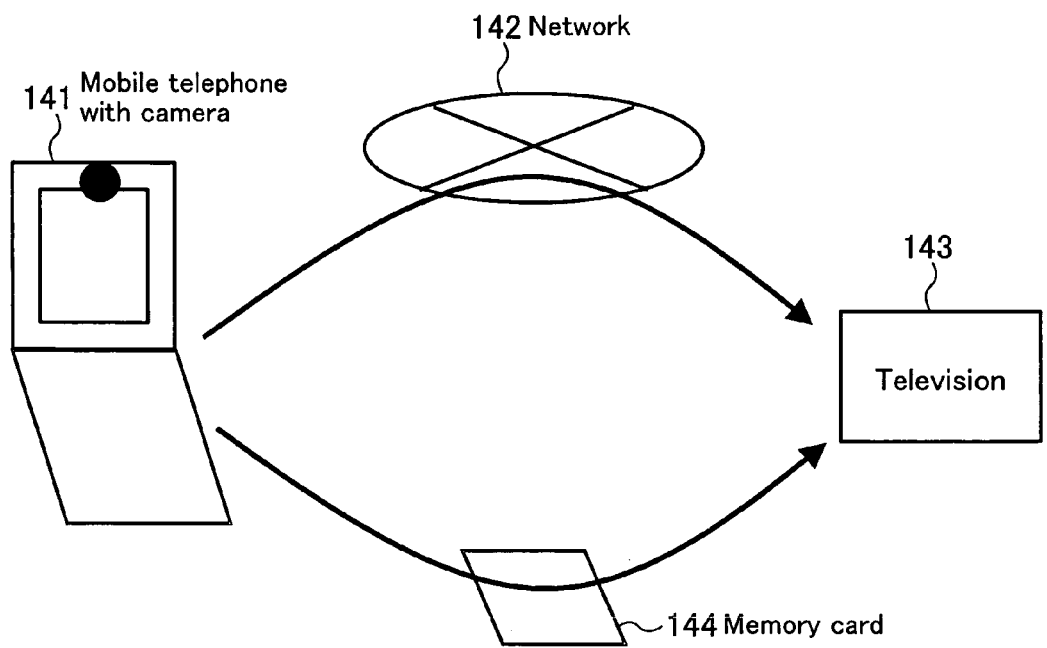
FIG. 23 is a diagram illustrating a third structural example which performs the image process of the present invention.

FIG. 23 is a diagram illustrating a structure composed of a mobile telephone with camera and a television, as a third structural example which performs the image process of the present invention. A mobile telephone with camera 141 transmits image data via a network 142 or a memory card 144 to a television 143. The mobile telephone with camera 141 can obtain a characteristic of a subject, and transmits the obtained subject characteristic via the network 142 or the memory card 144 to the television 143. For example, a portion of pixels of an image capturing device of the camera may be adapted to obtain spectral information or infrared information of a subject.

An image processing circuit which can perform the above-described image process is incorporated in the television 143. A resolution of the mobile telephone with camera 141 is lower than a resolution of the television 143. In order to make the best of display ability of the television 143, the image processing circuit of the television 143 produces an enlarged image, which is in turn displayed on a screen.

Figure 24:
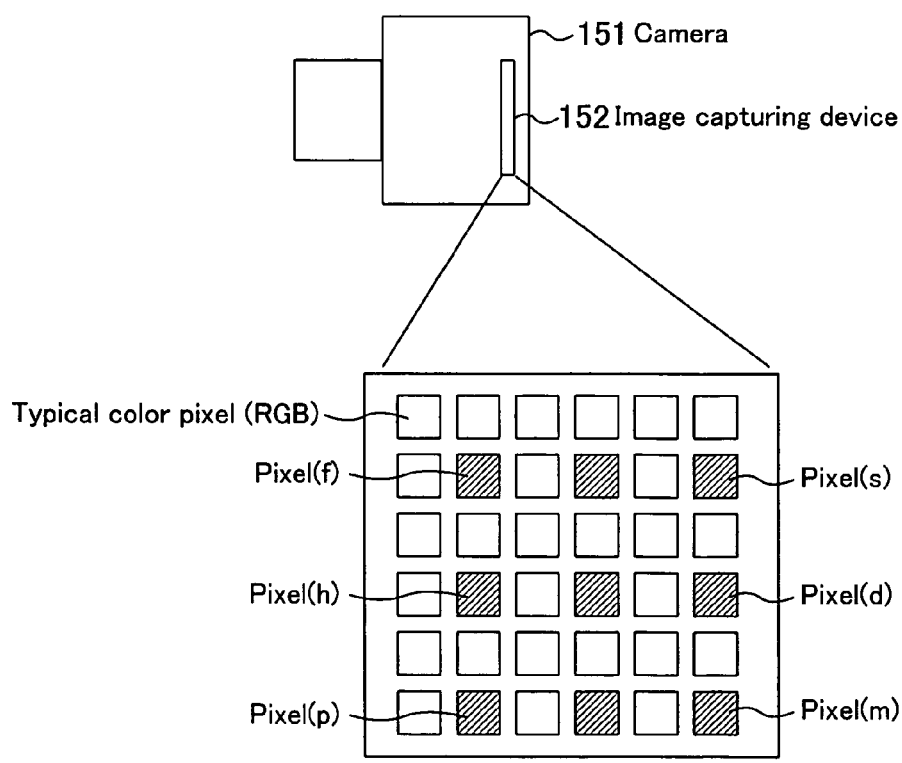
FIG. 24 is a diagram illustrating a structure of a camera which can obtain a characteristic of a subject.

FIG. 24 is a diagram illustrating a structure of a camera which can obtain a characteristic of a subject. As illustrated in FIG. 24, an image capturing device 152 of a camera 151 contains typical RGB color pixels and, in addition, pixels having a wavelength selective characteristic with respect to a specific material (e.g., flesh f, hair h, etc.), which are arranged at a low resolution and in accordance with a predetermined rule. Thereby, material information of a subject can be obtained when an image of the subject is captured.

Thus, the present invention can be implemented in general video apparatuses, such as a television and the like, when a widespread mobile telephone with camera, digital still camera, video camcorder, or the like is partially adapted, and does not require a special operation, management, or the like. Note that the present invention does not limit a connection form between apparatuses and the internal structure of an apparatus in terms of an implementation of dedicated hardware, a combination of software and hardware, or the like.

FOURTH STRUCTURAL EXAMPLE

Figure 25:
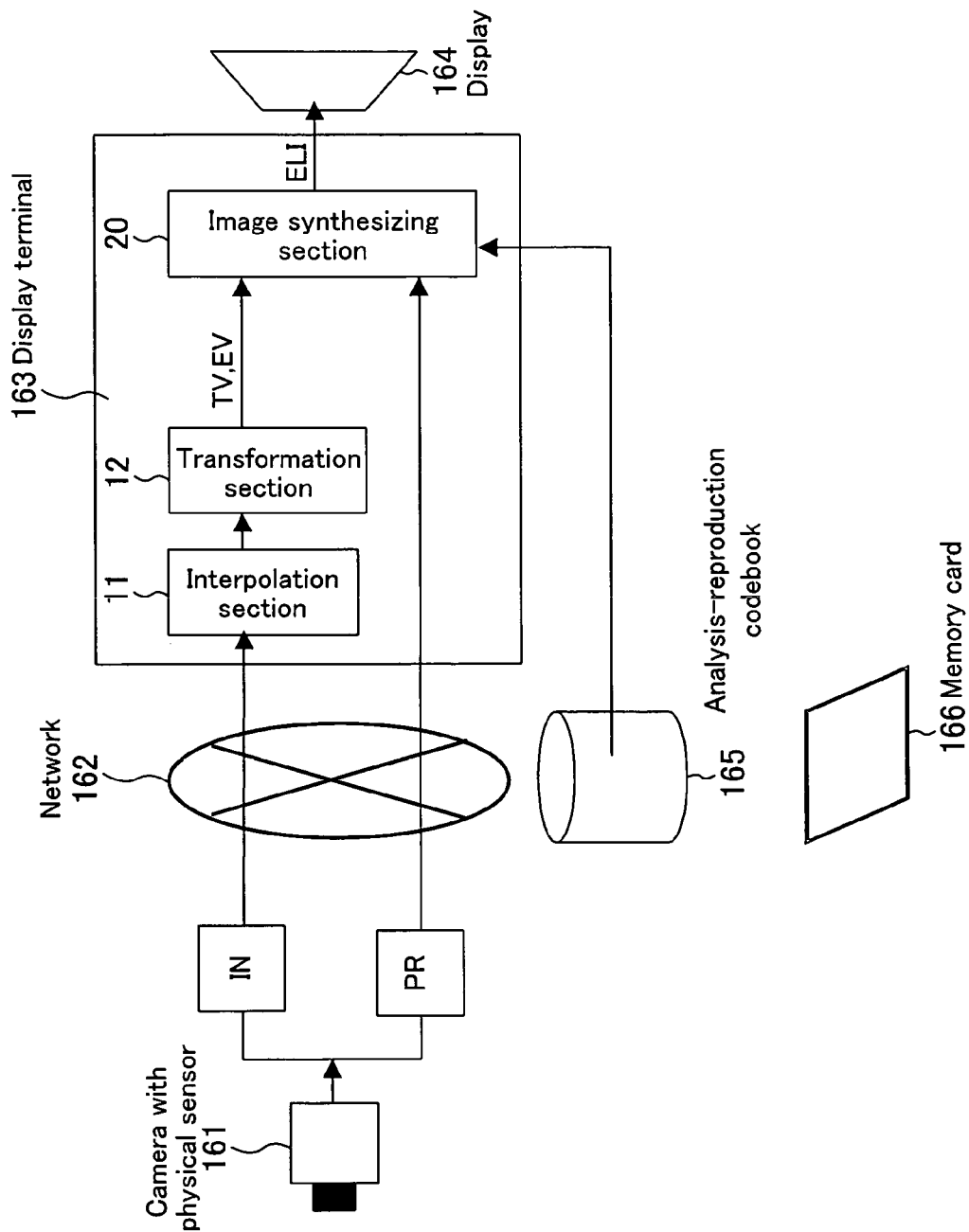
FIG. 25 is a diagram illustrating a fourth structural example which performs the image process of the present invention.

FIG. 25 is a diagram illustrating a structure in which a network system is used, as a fourth structural example which performs the image process of the present invention. In FIG. 25, an image of a subject is captured by a camera with physical sensor 161. A resolution at which the camera with physical sensor 161 can capture an image is lower than a resolution of a display 164. In order to make the best of display ability of the display 164, the above-described image enlarging process is performed in a display terminal 163.

A sensor which can obtain a characteristic of a subject is attached to the camera with physical sensor 161, thereby making it possible to obtain a low-resolution image IN and a physical characteristic parameter PR. The information is transmitted via a network 162 to the display terminal 163. In the display terminal 163, an interpolation section 11 enlarges and interpolates the low-resolution image IN, and a transformation section 12 transforms the interpolated image to a texture vector TV and an edge contour vector EV. The image synthesizing section 20 uses the physical characteristic parameter PR to transform the texture vector TV and the edge contour vector EV so as to sharpen an image, and performs transformation inverse to the vector transformation to generate a high-resolution enlarged image ELI. The enlarged image ELI is displayed on the display 164.

In this case, an analysis-reproduction codebook 165 is provided via a network or a recording medium, such as a memory card 166. In this case, for example, when the memory card 166 is not provided, a high-quality image cannot be obtained. Therefore, it is possible to provide a service such that only an authenticated user can view high-image quality video.

FIFTH STRUCTURAL EXAMPLE

Figure 26:
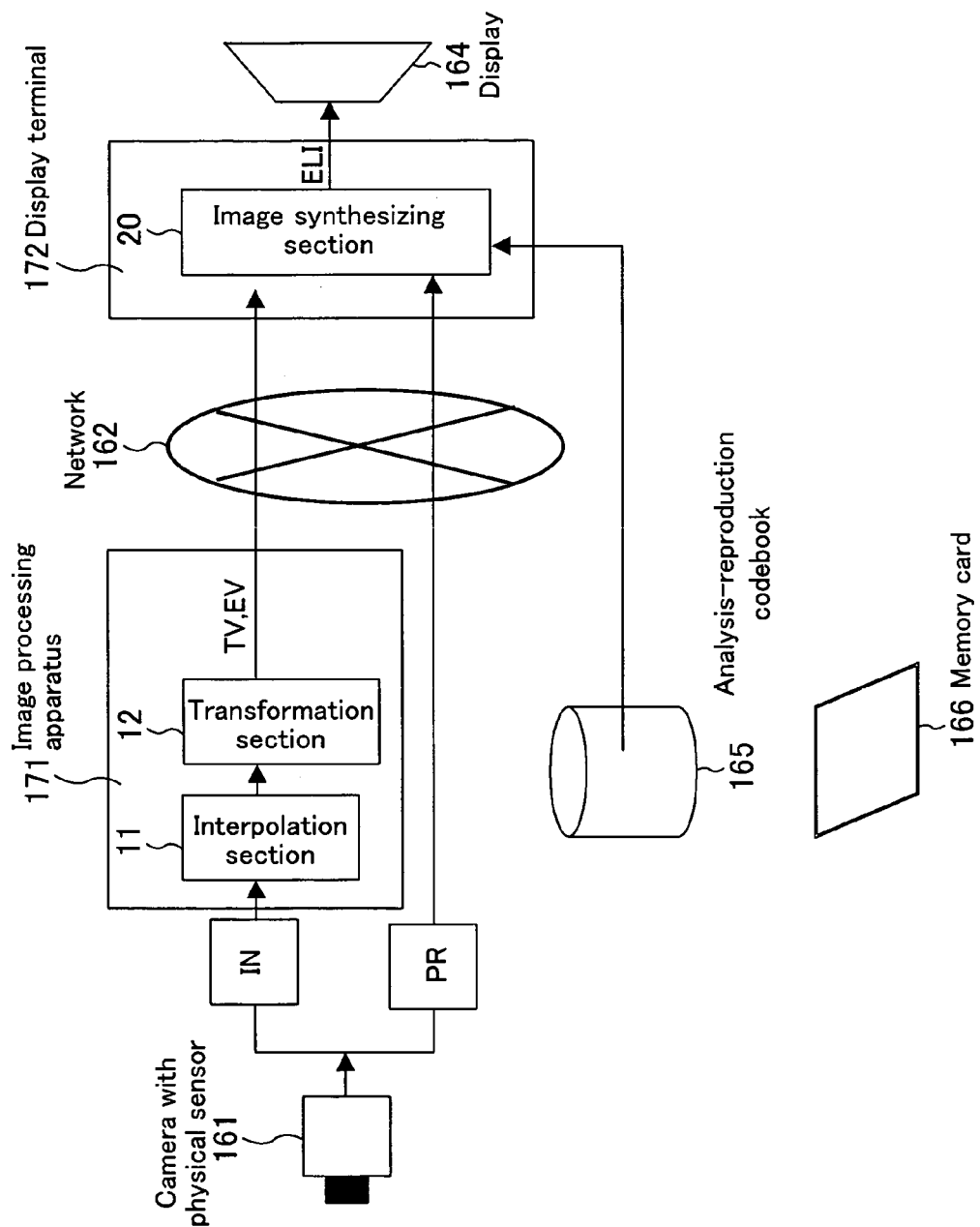
FIG. 26 is a diagram illustrating a fifth structural example which performs the image process of the present invention.

FIG. 26 is a diagram illustrating a structure in which a network system is used, as a fifth structural example which performs the image process of the present invention. The stucture of FIG. 26 is substantially the same as that of FIG. 25, except that an image processing apparatus 171 having an interpolation section 11 and a transformation section 12 is provided immediately before a network 162.

Specifically, a texture vector TV and an edge contour vector EV obtained by the transformation section 12 are transmitted from the image processing apparatus 171 via the network 162 to a display terminal 172. In this case, when wavelet transformation or the like is used, certain image compression is considered to be performed.

Figures 27A, 27B:
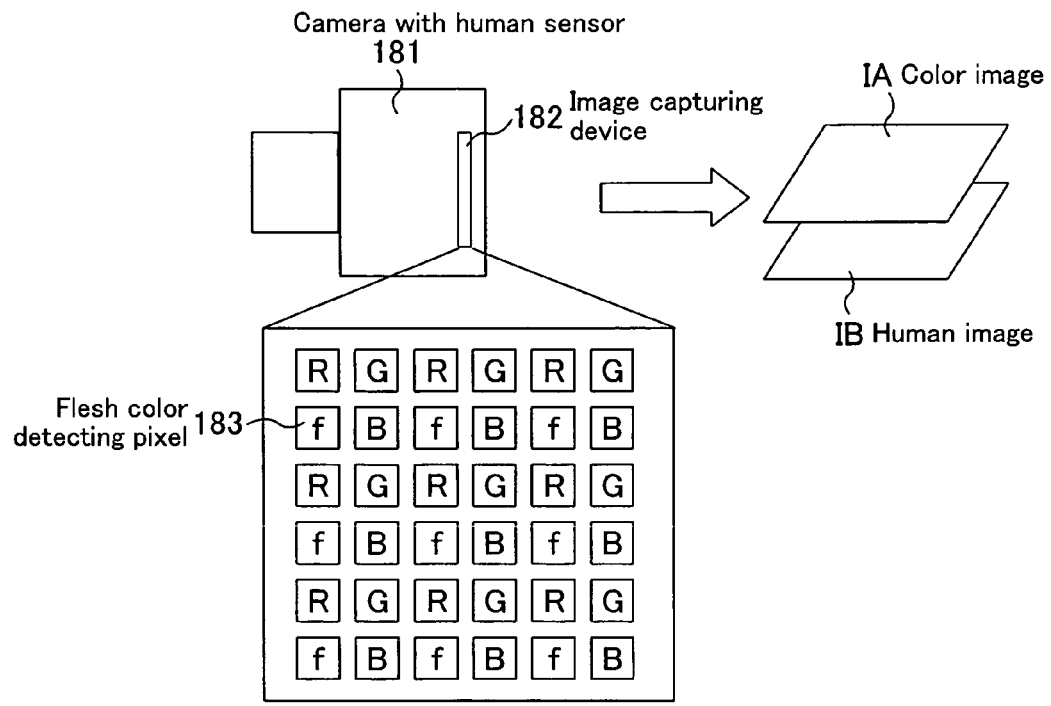
FIGS. 27A and 27B are diagrams illustrating a structure of a camera with human sensor, and pixel spectral sensitivity.

FIG. 27A is a diagram illustrating a structure of a camera with human sensor as an example of the camera with physical sensor. The camera with human sensor 181 of FIG. 27A uses a sensor having sensitivity to spectral information of flesh of a human to obtain a color image IA, and a human image IB whose pixel position coincides with that of the color image IA.

An image capturing device 182 has a mosaic structure in which color pixels (RGB) and flesh color detecting pixels 183($f$) are arranged. The flesh color detecting pixel 183 is achieved by adding to an image capturing device a filter having a filter spectral transmittance of $Ff(\lambda)$ as illustrated in FIG. 27B. Whereas the color pixel (RGB) has a spectral transmittance similar to that of general color sensors, the flesh color detecting pixel 183 has a transmittance similar to a spectroscopic characteristic of a human flesh (melanin, carotene, hemoglobin), and particularly has a maximum integrated value of transmittance with respect to a human flesh.

Although the color sensor is described above as an example, the present invention can be applied to a monochrome sensor, which is assumed to have R, G, and B pixels having the same spectral distribution.

Figure 28A:
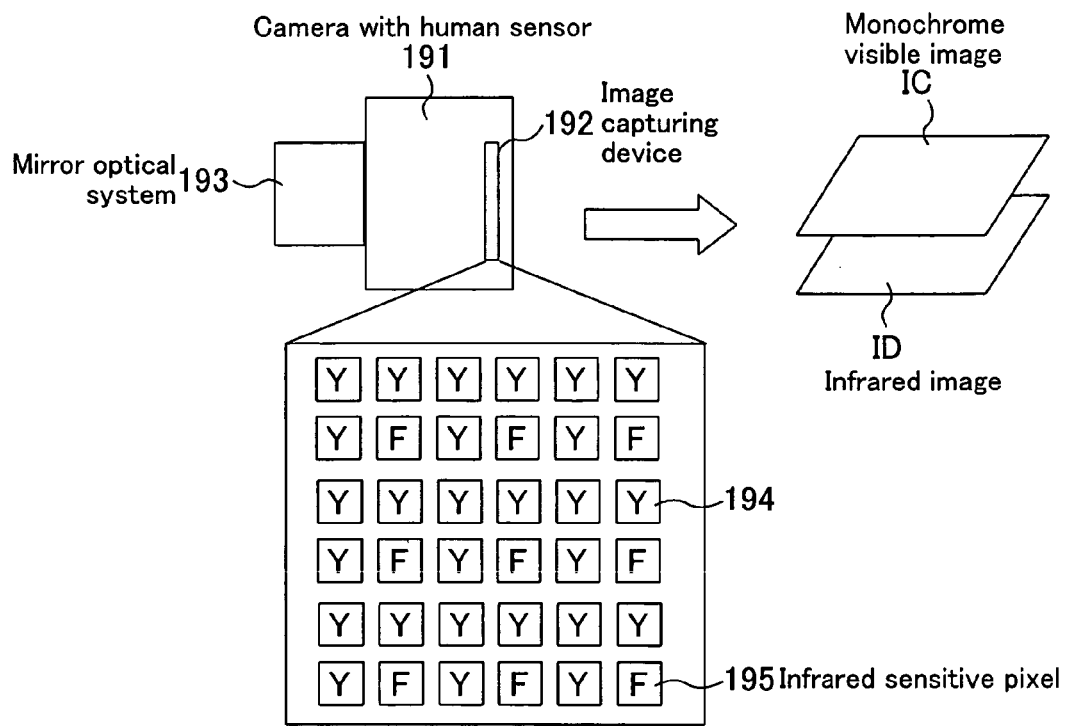
FIGS. 28A and 28B are diagrams illustrating a structure of a camera with human sensor, and pixel spectral sensitivity.

FIG. 28A is a diagram illustrating another structure of the camera with human sensor. The camera with human sensor 191 of FIG. 28A uses a sensor having sensitivity to spectral information of human flesh to obtain a monochrome visible image IC, and an infrared image ID whose pixel position coincides with that of the monochrome visible image IC.

The structure of FIG. 28A is significantly different from that of FIG. 27A in that infrared radiation information corresponding to the temperature of human flesh is obtained instead of detection of flesh using visible spectral information.

Figure 28B:
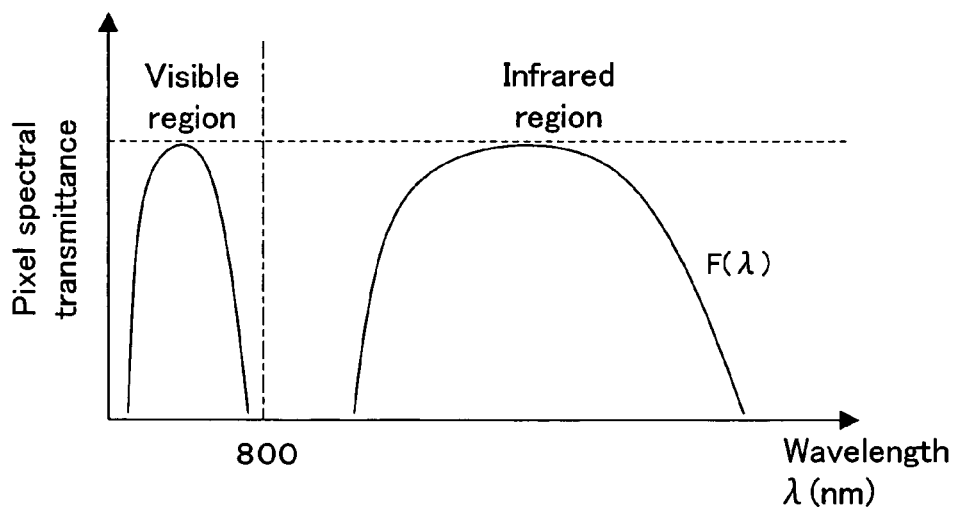

An image capturing device 192 has a mosaic structure in which infrared sensitive pixels 195(f) are distributed among visible monochrome brightness pixel 194 (Y). The camera with human sensor 191 also has a mirror optical system 193, but not a glass lens optical system which does not transmit infrared light, in order to simultaneously capture infrared radiation and visible light. As illustrated in FIG. 28B, the Y pixel has sensitivity to a visible region of 800 nm or less, and the F pixel has sensitivity to an infrared region.

Although the monochrome sensor is described above as an example, a color sensor can be achieved if three of the same image capturing sensor are used.

According to the present invention, a sharpened image or an enlarged image in which a characteristic of a subject, such as a material or the like, is more effectively reflected than in conventional techniques, is generated. Therefore, the present invention can be applied to various applications in which importance is put on a visual information amount. For example, in the field of electronic commerce, details of a product of interest can be presented to consumers. In the field of digital archives, details of an exhibit can be accurately presented to viewers. In the field of video production, the potential of video representation can be increased. In the field of broadcasting, the compatibility of various video formats can be guaranteed.

What is claimed is:

1. An image processing method comprising:
a first step of performing predetermined vector transformation with respect to an original image to calculate an image feature vector;
a second step of obtaining a characteristic of a subject appearing in the original image, and calculating a physical characteristic parameter of the original image from the obtained subject characteristic;
a third step of transforming the image feature vector with reference to the physical characteristic parameter to sharpen the original image; and
a fourth step of subjecting the transformed image feature vector to transformation inverse to the predetermined vector transformation, to generate a new image,
wherein the obtained subject characteristic is at least one of material information of the subject and distance information from a camera to the subject.

2. The method of claim 1, wherein the predetermined vector transformation employs Laplacian pyramid analysis or wavelet analysis.

3. The method of claim 1, wherein the third step includes:
vector-quantizing the image feature vector with reference to an analysis codebook to calculate a quantization index;
selecting an optimal reproduction codebook from a previously prepared reproduction codebook group in accordance with the physical characteristic parameter; and
looking up the selected reproduction codebook using the quantization index to obtain the transformed image feature vector.

4. An image processing method comprising:
a first step of performing predetermined vector transformation with respect to an original image to calculate an image feature vector;
a second step of obtaining a characteristic of a subject appearing in the original image, and calculating a physical characteristic parameter of the original image from the obtained subject characteristic;
a third step of transforming the image feature vector with reference to the physical characteristic parameter to sharpen the original image; and
a fourth step of subjecting the transformed image feature vector to transformation inverse to the predetermined vector transformation, to generate a new image,
wherein:
the first step includes obtaining a texture vector and an edge contour vector respectively corresponding to a texture portion and an edge contour portion of the original image, separately, as the image feature vector;
the third step includes transforming the texture vector and the edge contour vector separately;
the fourth step including subjecting the transformed texture vector and the edge contour vector together to the inverse transformation; and
the third step including transforming the texture vector based on at least one of information concerning a material of the subject and information concerning a distance between the subject and a camera, the information being contained in the physical characteristic parameter.

5. An image processing method comprising:
a first step of performing predetermined vector transformation with respect to an original image to calculate an image feature vector;
a second step of obtaining a characteristic of a subject appearing in the original image, and calculating a physical characteristic parameter of the original image from the obtained subject characteristic;
a third step of transforming the image feature vector with reference to the physical characteristic parameter to sharpen the original image; and
a fourth step of subjecting the transformed image feature vector to transformation inverse to the predetermined vector transformation, to generate a new image,
wherein:
the first step includes obtaining a texture vector and an edge contour vector respectively corresponding to a texture portion and an edge contour portion of the original image, separately, as the image feature vector;
the third step includes transforming the texture vector and the edge contour vector separately;
the fourth step including subjecting the transformed texture vector and the edge contour vector together to the inverse transformation; and
the third step includes transforming the edge contour vector based on designated scene information.

6. An image enlarging method comprising the steps of:
enlarging and interpolating an image; and
subjecting the enlarged and interpolated image as the original image to an image process in accordance with the image processing method of claim 1.

7. An image processing apparatus comprising:
a transformation section of performing predetermined vector transformation with respect to an original image to calculate an image feature vector;
a characteristic obtaining section of obtaining a characteristic of a subject appearing in the original image, and calculating a physical characteristic parameter of the original image from the obtained subject characteristic; and
an image synthesizing section of transforming the image feature vector with reference to the physical characteristic parameter to sharpen the original image, and subjecting the transformed image feature vector to transformation inverse to the predetermined vector transformation, to generate a new image, wherein the characteristic obtaining section obtains material information of the subject as the subject characteristic.

8. The apparatus of claim 7, wherein the characteristic obtaining section includes a sensor section capable of observing a spectroscopic characteristic, and uses an output of the sensor section to obtain the material information of the subject.

9. The apparatus of claim 7, wherein the characteristic obtaining section includes an image capturing device having a pixel with spectral sensitivity specific to a predetermined material, and uses an output of the image capturing device to obtain the material information of the subject.

10. The apparatus of claim 7, wherein the characteristic obtaining section reads material information recorded in a wireless tag attached to the subject.

11. An image processing apparatus comprising:

a transformation section of performing predetermined vector transformation with respect to an original image to calculate an image feature vector;

a characteristic obtaining section of obtaining a characteristic of a subject appearing in the original image, and calculating a physical characteristic parameter of the original image from the obtained subject characteristic; and an image synthesizing section of transforming the image feature vector with reference to the physical characteristic parameter to sharpen the original image, and subjecting the transformed image feature vector to transformation inverse to the predetermined vector transformation, to generate a new image, wherein the characteristic obtaining section obtains distance information from a camera to the subject as the subject characteristic.

* * * * *